United States Patent [19]

Inooka et al.

[11] 4,152,250

[45] May 1, 1979

[54] DEMETALLATION OF HYDROCARBONS WITH CATALYSTS SUPPORTED ON SEPIOLITE

[75] Inventors: Masayoshi Inooka, Yokohama; Motoyoshi Wakabayashi, Kawasaki; Masatoshi Matsuda; Masaaki Kasuya, both of Yokohama; Yoshihiro Ohguchi, Ebina; Munekazu Nakamura, Kamakura; Tatsuo Morimoto, Yokohama, all of Japan

[73] Assignee: Chiyoda Chemical Engineering & Construction, Yokohama, Japan

[21] Appl. No.: 806,850

[22] Filed: Jun. 15, 1977

Related U.S. Application Data

[62] Division of Ser. No. 748,752, Dec. 9, 1976, abandoned.

[30] Foreign Application Priority Data

| Dec. 9, 1975 | [JP] | Japan | 50-145902 |
|---|---|---|---|
| Dec. 16, 1975 | [JP] | Japan | 50-149120 |
| Dec. 16, 1975 | [JP] | Japan | 50-149121 |
| Jan. 23, 1976 | [JP] | Japan | 51-5816 |
| Feb. 2, 1976 | [JP] | Japan | 51-9247 |
| Feb. 9, 1976 | [JP] | Japan | 51-13018 |
| Mar. 19, 1976 | [JP] | Japan | 51-30628 |
| May 10, 1976 | [JP] | Japan | 51-52088 |
| Jul. 10, 1976 | [JP] | Japan | 51-82329 |
| Sep. 3, 1976 | [JP] | Japan | 51-104955 |
| Sep. 14, 1976 | [JP] | Japan | 51-110417 |

[51] Int. Cl.$^2$ ............................................. C10G 23/02
[52] U.S. Cl. .............................. 208/251 H; 208/213; 208/216 R; 208/216 PP; 208/217; 208/254 H
[58] Field of Search ........... 208/213, 216, 217, 254 H, 208/251 H, 110, 143, 255

[56] References Cited

U.S. PATENT DOCUMENTS

| 3,004,914 | 10/1961 | White | 208/143 |
|---|---|---|---|
| 3,051,647 | 8/1962 | White | 208/143 |
| 3,258,431 | 6/1966 | Fisher et al. | 208/255 |
| 3,301,913 | 1/1967 | Holmes et al. | 208/255 |
| 3,308,071 | 3/1967 | White | 208/255 |
| 3,691,066 | 9/1972 | Carruthers et al. | 208/217 |
| 3,714,030 | 1/1973 | Winsor et al. | 208/217 |

Primary Examiner—George Crasanakis
Attorney, Agent, or Firm—Armstrong, Nikaido, Marmelstein & Kubovcik

[57] ABSTRACT

This invention relates to a catalyst for hydrotreatment of hydrocarbons comprising one or more of metals selected from the group consisting of transition metals and metals of group IIb of the periodic table supported on sepiolite. More particularly it relates to a catalyst effective in the selective demetallization treatment of hydrocarbons.

2 Claims, 5 Drawing Figures

DEMETALLATION OF HYDROCARBONS WITH CATALYSTS SUPPORTED ON SEPIOLITE

This is a division of application Ser. No. 748,752, filed Dec. 9, 1976 and now abandoned.

BACKGROUND OF THE INVENTION (1) Field of the Invention

This invention relates to a catalyst for hydrogenation or selective demetallization treatment of hydrocarbons, which comprises on or more metals selected from the group consisting of transition metals and metals of group IIb of the periodic table supported on sepiolite, and the method for preparation of said catalyst as well as the process for the hydrogenation and demetallization in the presence of said catalyst under a hydrogen pressure and at a high temperature.

(2) Description of the Prior Art

Impurities such as sulfur, nitrogen and metals are contained in the hydrocarbons including crude oils, heavy oils, cracked oils, deasphalted oils, topped residual oils, vacuum gas oils, tar sands, bitumens, shale oils, or the mixtures thereof. These impurities are discharged into the atmosphere together with the exhaust gas when these hydrocarbons are subjected to combustion, becoming a source of the environmental pollution. Also, the soluble metals contained in the hydrocarbons are deposited on a catalyst in the catalytic treatment of hydrocarbons, causing a marked decrease in the catalytic activity of the catalyst and the selectivity of the reaction. Therefore, in order to utilize the hydrocarbons as a harmless energy source or as the starting material in a catalytic process, it is necessary to remove sulfur, nitrogen and metals from them beforehand. Above all, it is becoming an indispensable requisite that the metals are removed previous to the treatment of non-metallic impurities such as sulfur and nitrogen. Since these metals were, heretofore, simultaneously treated together with sulfur, nitrogen and the like without subjecting to any pretreatment, it was necessitated to use the catalyst in an amount in large excess to the theoretical amount required for desulfurization or denitrification. But as the catalysts for these desulfurization and denitrification are very expensive the development of an inexpensive catalyst which is excellent in demetallization characteristic has been desired.

In the prior art, when demetallization treatment is carried out beforehand, hydrocarbons are treated by utilizing either an ordinary desulfurization catalyst or a waste catalyst having almost no desulfurization activity, or using bauxite, red mud and the like as the catalyst in the so-called guard reactor. All these catalysts, however, have defects in that the activity of demetallization is low or the life time of the catalysts is too short, and moreover, they are very unsatisfactory for the purpose of carrying out a selective and effective demetallization reaction.

In the case of a catalyst having a relatively high demetallization activity, usually the desulfurization reaction also proceeds simultaneously, and as a result this often causes trouble in the utilization of the hydrocarbons thus demetallized. For example, red mud is available at a very low price and in quantities and is a useful catalyst for demetallization having the activity of removing, under a high hydrogen pressure, the metals contained in hydrocarbon oils, especially vanadium, nickel and iron. But, it has defects in that the demetallization treatment must be carried at high temperatures requiring a very long contact time. The oils treated in the presence of the red mud-catalyst is extremely instabilized as a result of a long residence time at a high temperature, and further it may happen that carbonaceous substances are caused to be deposited to clog the reactor near the exit of the catalyst layer. In order to avoid such trouble the treatment may be carried out at a relatively low temperature, but it takes a still longer time and is very disadvantageous from an economical viewpoint because of the necessity of providing a large-sized reaction.

Bauxite is also available at a price as low as that of red mud and has a demetallization activity higher than that of red mud. But, bauxite has defects in that the lowering in the activity is considerably large on account of its small pore volume and the life time of catalyst is short. A catalyst having such a small pore volume as bauxite is not suitable for the treatment of hydrocarbons containing a high content of metals.

Incidentially, the demetallization reaction of hydrocarbons is the so-called hydrogenation reaction which is carried out in the presence of catalyst under a hydrogen pressure and at a high temperature. It has been known for a long time that the detallization reaction takes place together with a desulfurization reaction since metals are deposited on a catalyst in the course of the desulfurization reaction. In the desulfurization treatment using a conventional desulfurization catalyst, the higher the desulfurization ratio is raised, the higher the demetallization becomes, and the desulfurization and demetallization reactions take place in an almost definite proportion under the same condition. On the contrary, even when demetallization is carried out by using a conventional desulfurization catalyst, it is totally impossible to avoid the desulfurization reaction which takes place in the definite proportion. These phenomena will be further studied in comparison with the effects obtained by the present invention in the following.

SUMMARY OF THE INVENTION

The present inventors have found that a catalyst which comprises one or more of metals selected from the group consisting of transition metals and metals of group IIb of the periodic table supported on sepiolite carrier is an inexpensive catalyst which is very useful for the demetallization reaction of hydrocarbons and by which the demetallization reaction can be selectively carried out.

Accordingly, it is an object of the present invention to provide a novel catalyst for hydrotreating of hydrocarbons. It is another object of the invention to provide a method for preparation of the catalyst. It is a further object of the invention to provide a method for desulfurization, denitrification and/or demetallization of hydrocarbons by using the catalyst. Other objects and aspects of the present invention will become apparent from the following description.

These objects of the present invention have been fulfilled by the embodiments represented by: a novel catalyst for hydrotreating of hydrocarbons which comprises an effective amount of one or more of metallic compounds supported on sepiolite carrier, the metal(s) of said metallic compound(s) being selected from the group consisting of transition metals and metals of group IIb of the periodic table: a method for preparation of the catalyst which comprises two combined treating steps: and a method for desulfurization, denitrification and/or demetallization of hydrocarbons which comprises treating the hydrocarbons in the presence of pressurized hydrogen and at a high temperature by using the catalyst.

When compared with a conventional desulfurization catalyst, the catalyst of the present invention has a far much larger ratio of demetallization rate to desulfurization rate and provides a more selective demetallization reaction. Thus, the catalyst is very valuable in the industrial use as a novel catalyst for demetallization. Further, the present invention provides a catalyst having a high hydrogenation activity and a longer life time for treatment of hydrocarbons in suitably chosen combinations of the steps of grinding, kneading, moisture conditioning, and/or molding, utilizing the unique properties of sepiolite.

DETAILED DESCRIPTION OF THE INVENTION

Figure 1:
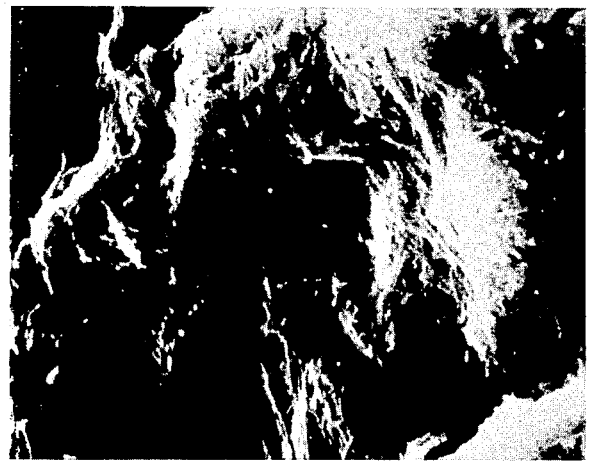
FIG. 1 is a photomicrograph (magnification × 10,000, with an electron microscope) of natural sepiolite of Spanish product which was ground into a powder 50 mesh or smaller in size and subjected to moisture conditioning.

The catalytic metal or metals to be supported according to the present invention, are one or more of metals selected from the group consisting of metals of group IIb and transition metals of the periodic table. Namely, use is made of one or more of the metallic compounds selected from the group consisting of the compounds of Cu, Ag and Au of group Ib; Sc, Y, lanthanides and actinides of group IIIa; Ti, Zr and Hf of group IVa; V, Nb and Ta of group Va; Cu, Mo and W of group VIa; Mn, Tc and Re of group VIIa; and Fe, Co and Ni of iron group, Ru, Rh and Pd of palladium group, Os, Ir and Pt of platinum group; and Zn, Cd and Hg of group IIb. Among these metals the preferable are Co, Ni, Fe, Cu, lanthanides, V, Cr, Mo and W. Furthermore, the combind use of both one or more compounds of the metal(s) selected from Co, Ni, Fe, Cu, and lanthanides, and one or more compounds of the metal(s) selected from Mo, W and V is especially effective in the present invention.

These metals are generally utilized in the forms of nitrates, suflates, salts of metallic acids, complex salts or other water-soluble compounds. The addition of these compounds to sepiolite can be conducted according to the conventional methods such as immersion, spraying and kneading. These compounds are employed generally in an amount of 0.1 to 20% by weight (as metal) on the basis of carrier (as anhydride), and usually 0.2 to 10% by weight will suffice.

Sepiolite is a porous magnesium-silicate mineral which is also called meerschaum. The sepiolite natually occurs as a secondary mineral in a serpentine; and its synthetic product was prepared from cheaply available silicic compounds and magnesium salts in 1935 or so and in now marketed under the trade name of "magnesiumtrisilicate". For the purpose of the present invention, any natural or synthetic sepiolite can be employed, and both the α type-sepiolite and β type-sepiolite that are known to exist can be used in the present invention. When sepiolite is used as the carrier of catalyst, the starting material sepiolite as it is or the sepiolite which was dried below 200° C. or usually at about 100° to about 120° C. to remove the adhered moisture, and ground to the desired particle size. In general, the sepiolite having a particle size of 0.3 to 3 mm in volume average diameter is most often employed. If necessary, sepiolite can be treated in combinded steps of grinding, molding, sintering, etc. so as to meet the particular use purpose. The size and shape of the carrier can be suitably selected in accordance with the reaction conditions of hydrotreating, the types of the reaction apparatus and the like.

In the case of some metals, the ion-exchange property of sepiolite can be utilized to have the metals supported on sepiolite. These metals include those of Groups Ib, IIb and IIIa and iron group of the periodic table and preferably Co, Ni, Fe, Zn, Cu and lanthanides. By contacting an acidic aqueous solution of these metal ions with sepiolite, magnesium contained in the sepiolite is ion-exchanged with these metals to have these metals supported on the sepiolite. These metals are used in the form of an aqueous solution of the salts of mineral acids such as chlorides, sulfates and nitrates and/or the salts of organic acids such as formates and acetates. If necessary, inorganic acids or organic acids are added to the solution so as to adjust the pH of the solution to 1–7.

The concentration of the metallic salt(s) in the aqueous solution is determined according to the amount of the metal(s) to be supported, the kind thereof and the condition of the supporting treatment. When a concentrated solution is employed, magnesium contained in sepiolite tends to elute from the sepiolite in larger amounts relative to the amount of the metal to be supported. Therefore, in the case where too high a concentrated concentration is employed, the structure of sepiolite may be destroyed until it eventually pulverizes. A similar phenomenon may take place when an inorganic acid or an organic acid is added to the solution in an extremely large amount. Therefore, it is necessary to employ the acidic solution having a pH in the range of 1 to 7 as above described. A solution having a pH lower than 1 may also be used, but in this case the treatment should be conducted in a very short period of time. The process of this invention is characterized by that the metal is supported on the carrier while portion of the magnesium contained in the sepiolite is being allowed to dissolve, as already described. Accordingly, it is presumed that the metal is ion-exchanged with a considerable amount of the magnesium to be supported on the sepiolite. The metal thus supported does not dissolve even when rinsed with pure water, but dissolves in an acidic solution. In the process of this invention it is essential that the metal supported is substituted by magnesium, and thus the metal simply deposited on the sepiolite without being substituted is lower in the catalytic activity per unit weight of the metal than that of the metal substituted. Therefore, it is desirable that the metal simply deposited on the sepiolite is removed by rinsing and effectively reused.

The sepiolite thus treated to support the metal and rinsed can be used as it is, or after drying or baking at a temperature below about 1,000° C., or after grinding and molding into the desired shape.

When both the metal(s) which can be supported according to the ion-exchange method and the metal(s) which can not be supported thereby are to be supported on the same sepiolite, the conventional impregnating method, spraying method and the like can be applied using an aqueous solution containing both the metals; but, it is very effective for the activity of the resulting catalyst to support the former metal(s) by the ion-exchange method and then to support the latter metal(s) as an aqueous ammonia or amine solution thereof. In the process of this invention it is also essential that the supporting treatment is carried out by an ion-exchange reaction using an acidic aqueous solution in the first step, and using an basic aqueous solution in the second step, and moreover, the first and second steps are carried out in this order.

Usually, the metal supported in the first step is not the same as the metal supported in the second step, but if desired, the same metal can be supported in these two steps. In the first step, the magnesium contained in sepiolite is substituted by the metal dissolved in an acidic aqueous solution through an ion-exchange reaction, while in the second step, the supporting is per se the same as that achieved by the conventional impregnating method. Therefore, it is considered that the metal in the first step is supported in a state quite different from the metal in the second step. These states of the metals supported can not be distinguished from each other according to the ordinary analysis or by an observation of the microstructure. But, as a clear difference is found in the catalytic activity, after metals have been supported between the catalyst prepared by these two-step method and the catalyst obtained by the conventional one-stage method, it is judged that each of the metals treated according to the two-step method of the present invention is supported in a structurally different state from the metals treated by the conventional one-stage method, and thus, this results in the difference in catalytic activity.

The kind and amount of the metal(s) to be supported in the first step are generally determined in accordance with those of the metal(s) to be supported in the second step, but as the amount of the metal to be supported in the first step 0.1 to 5% (as metallic element) by weight will suffice.

In general, the sepiolite treated in the first step is rinsed with pure water and/or an aqueous solution containing ammonia or an amine and the, if necessary, dried or baked at a temperature below 1,000° C., followed by the treatment in the second step. In the above case it is essential that the metals supported in the first step are substituted by magnesium, and since the catalytic activity per unit weight of the metals simply adhered on the sepiolite without being substituted is lower than that of the metals substituted, the excess of these metals is removed by rinsing and effectively reused. The sepiolite treated in the first step and then rinsed is usually as such, or after drying below 1,000° C., subjected to the second step, but alternatively, it may also be ground and molded to the desired shape before subjecting to the second step.

The second step comprises supporting on a carrier one or more metals selected from the group consisting of metals of Groups Va and VIa, and iron group of the periodic table and Cu, preferably from the group consisting of Mo, W, V, Ni, Co, Cu and the like, by impregnating said carrier with an aqueous ammonia and/or amine solution containing these metals. This step is substantially the same as the conventional method for supporting a catalytic metal on a carrier. As these metallic compounds use is made of ammonium paramolybdate, ammonium silicotungstate, ammonium paratungstate, ammonium vanadate, or chlorides, sulfates, nitrates or formates of Ni, Co, Cu, and the like. Of course, other prior known compounds which are stable or can be converted to soluble compounds in a basic aqueous solution can also be used. These compounds are used by dissolving them homogeneously in an aqueous ammonia solution or an aqueous amine solution. The concentration of these metallic compounds as well as of ammonia or amines in the basic aqueous solution can be determined according to the amount of the metal to be supported and the properties of the sepiolite carrier treated in the first step. The metal to be supported in the second step can be treated in one-stage or multistage process. As the amount of metal to be supported in the second step generally 20% or less (as metallic element) by weight will suffice, but it preferably 2 to 20% by weight in the group of Mo, W and V and 0.1 to 10% by weight, in Ni, Co and Cu. The sepiolite carrying metallic compounds is baked or sintered at a temperature of 300° to 1,000° C., preferably 350° to 800° C. for use, but before use, it may also be pretreated, if necessary, such as by subjecting to sulfidizing, etc. as it is in an impregnated state without being baked or sintered.

The sepiolite used as the catalytic carrier in the present invention is a porous substance which not only occurs naturally as a hydrous magnesium silicate but also is readily available as a synthetic product, and is widely used as a catalytic carrier as well as an adsorbent and the like. The natural sepiolite, however, is not constant in the properties such as composition, pore volume, specific surface area, pore distribution and crushing strength. Further, when it is wanted to obtain this material of a given particle size by crushing and sieving of its mineral the yield is very poor. These defects have been a neck when used industrially in quantities.

Although sepiolite itself is a very porous substance having a large pore volume, it is not only difficult to obtain the material of uniform quality, but also most of the material, as it is, is not always so porous as to be sufficient for specific purposes. Moreover, the pore distribution of natural sepiolite covers a very broad range. The present inventors have found that the proportion of the volume of large pores more than 600Å in diameter occupying in the whole pore volume of ten accounts for 35% or more. The larger the proportion of such large pores, the smaller the specific surface area as well as the crushing strength of crushed product. Therefore, in some cases, where it is used as catalytic carrier, such crushed sepiolite as it is, is not undesirable in practice for specific purposes.

The present inventors investigated the properties of the sepiolites produced naturally in various countries as well as their useful application, and as a result found that sepiolite is a mineral having very unique properties and can be made into a molded product having excellent properties by subjecting it to specific treatment. Thus, the inventors have further succeeded in obtaining an excellent catalyst by modifying the sepiolite used as catalytic carrier. The porous molded product prepared according to the present invention has the following characteristics:

(a) sepiolite having markedly large pore volume and specific surface area in comparison with those of the raw sepiolite can be readily obtained;

(b) sepiolite having a larger specific surface area can be obtained by making the size of the pore volume comparable to, or smaller than that of the raw sepiolite;

(c) the molded sepiolite has a sharp pore distribution; and (d) the molded sepiolite has a large crushing strength.

The relation between the pore volume and the specific surface area of the molded product obtained according to the present invention is not necessarily critical, but it is possible to prepare the molded product having the desired pore volume and specific surface area.

It has been recognized by the present inventors that the porous molded product having the above-described excellent properties obtained according to the present invention is much improved in the fundamental structure of sepiolite in that the molded product is clearly different from the raw sepiolite in both the physical and chemical properties from the physical and chemical studies such as composition analysis, X-ray diffraction, measurement of specific surface area, measurement of pore distribution, observation under an electron microscope, measurement of crushing strength and the like of the raw sepiolite, the intermediate product and the final product.

Since the above-mentioned change in fundamental structure is scarcely observed in the molding step of the ordinary porous powder materials, it is considered that such a change is peculiar to sepiolite and has an excellent effect on the catalyst of the present invention.

Now the molding of sepiolite will be explained in the order of the procedure. Natural or synthetic sepiolite as raw material is ground by a grinder. The particle size of the resulting sepiolite powder may be in such a range as not to cause difficulty in the kneading or molding process and is generally desirable to be smaller than 50 mesh. However, in order to carry out the kneading efficiently, it is preferable to make the particle size as fine as possible. Accordingly, sepiolite is generally ground to fine powder in which 100-mesh or finer powder accounts for 50% or more. The method for grinding is not especially restricted, and either a wet method or a dry method can be employed.

The ground sepiolite is then treated in the following kneading step. One of the main characteristics in the process of the present invention resides in that the ground sepiolite is subjected to moisture conditioning and then to sufficient kneading or mastication. In the moisture conditioning step prior to the kneading, water is added to the ground sepiolite so as to carry out the kneading effectively and the following molding efficiently and smoothly.

The final water content of the resulting moist sepiolite has large effects on the properties of the resulting catalyst and on the molding properties as well. The water content, therefore, is determined in consideration of the properties of the raw sepiolite, the amount and kind of the additives later described, the properties of the kneaded material, the method for molding, the purpose of using the resulting catalyst, and the like. In general, the water content of the sepiolite is adjusted to from 20 to 350% by weight on the basis of anhydrous sepiolite, preferably to from 50 to 280% by weight. When the water content is less than 20%, it is difficult to obtain the catalyst having the desired properties as well as to mold it according to the ordinary molding method. When the water content is more than 350%, the sufficient crushing strength of the resulting catalyst can not be obtained and such water content is not practicable. In the case where additives are used in combination, the above-mentioned range of water content can be applied to the amount of a mixture of sepiolite and the additives. When the moist sepiolite is molded by an extruder, its water content is generally in the range of 80 to 350% by weight, and when it is molded by a tableting machine, its water content is generally in the range of 20 to 100% by weight.

The above-mentioned range of water content is characterized by being very large in comparision with those in the case where alumina, alumina-silica and the like are used as raw materials. This is due to the structure of sepiolite, and such a large amount of water acts effectively in the kneading step. In general, the kneading of porous powder is conducted to effect uniform dispersion of moisture and homogenizing of the components of the mixture. In the case of the kneading of moist powder in the molding of porous powder such as alumina, alumina-silica, etc., it is known that the specific surface area and pore volume of the kneaded material gradually decrease as the kneading proceeds. Therefore, it has been the technical common sense that the kneading is suppressed to such a minimum degree as required for enhancing the molding properties or crushing strength. Unexpectedly, in the case of sepiolite, the more sepiolite is kneaded, the larger the pore volume and pore surface area become and the sharper the pore distribution becomes.

In order to clarify these unique properties, sepiolite was observed under an electron microscope (magnification ×10,000) to reach the following conclusion.

Figure 2:
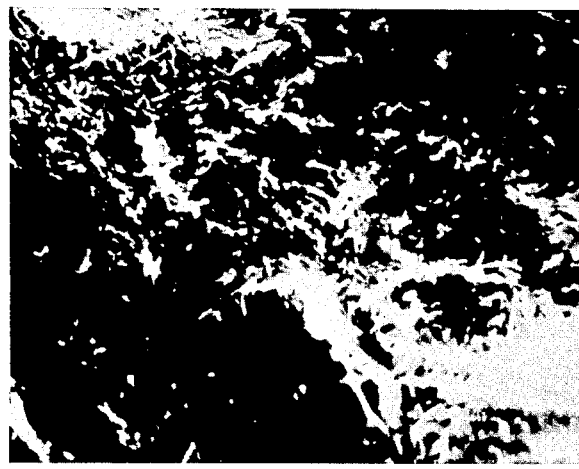
FIG. 2 is a photomicrograph (magnification × 10,000) of the above-mentioned moist sepiolite which was kneaded by passing through an extruder 3 times.

Referring now to the drawings, the photomicrograph (magnification ×10,000) of the sepiolite simply ground to fine powder indicates that the sepiolite fibers stick to one another to form thick fascicular fibers or lumps as clearly shown in FIG. 1. Whereas, the photomicrograph of the sepiolite which was subjected to grinding and moisture conditioning followed by sufficient kneading indicates that the thick fascicles and lumps of sepiolite fibers almost disappear, and short and thin fibers are scattered in disorder, as shown in FIG. 2. Accordingly, when the molded sepiolite having such a structure as shown in FIG. 1 is compared with the one having such a structure as in FIG. 2, it will be readily understood that the specific surface area and pore volume of the latter are markedly increased in comparison with those of the former.

Figure 3:
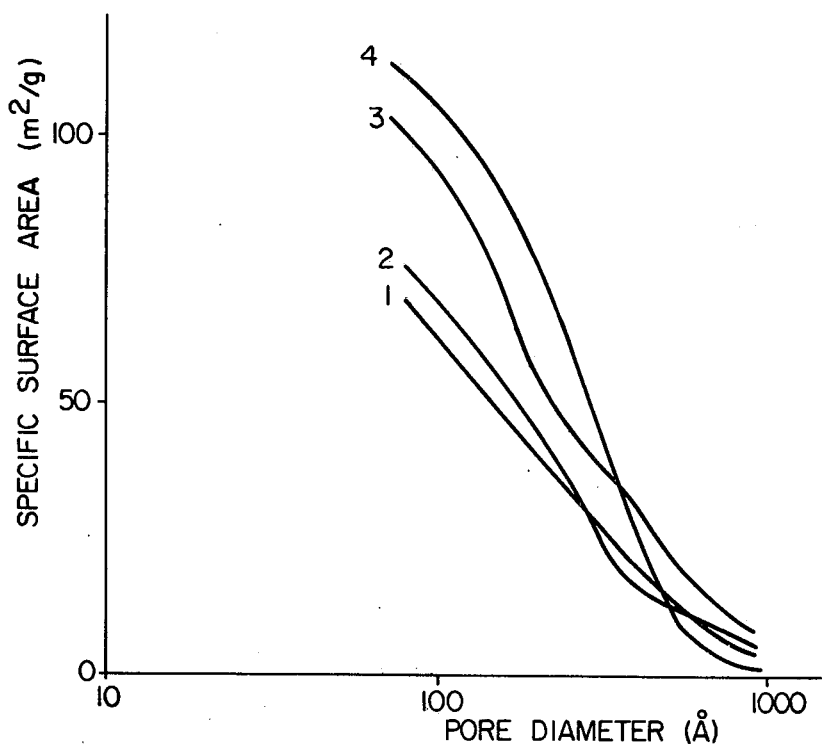
FIGS. 3 and 4 are the graphs showing the changes in the distribution of specific surface areas as well as those of pore volumes in the stages of grinding, kneading and molding of sepiolite according to the present invention, respectively.
Figure 4:
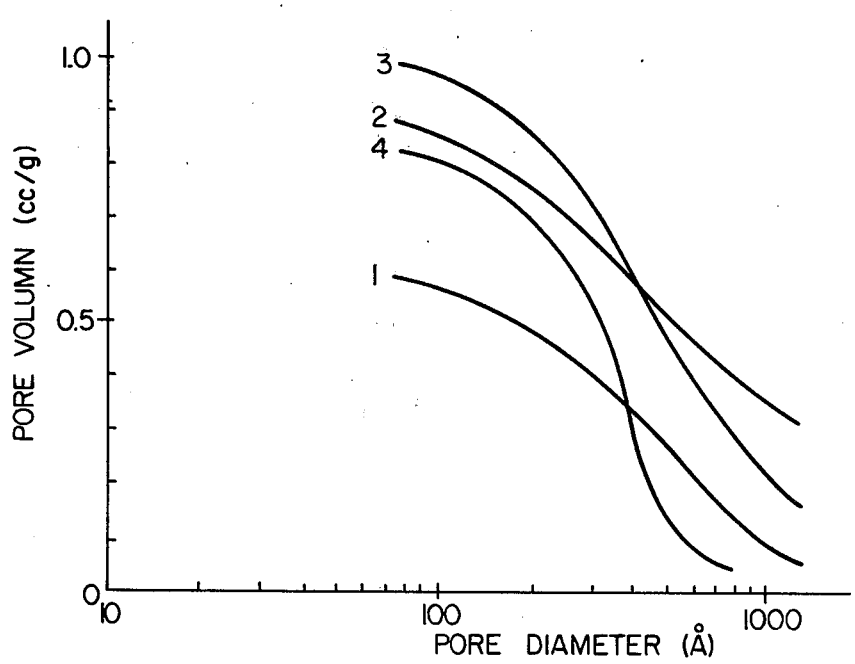

This phenomenon can also be proved by the changes in the distribution of specific surface area as shown in FIG. 3 as well as in the distribution of pore volumes as shown in FIG. 4 in each step of grinding, kneading and molding of sepiolite which were treated in this order. It is shown in FIG. 3 that the specific surface area of the kneaded material (3) or the molded material (4) is markedly increased in comparison with that of the sepiolite ore (1) or the ground sepiolite (2), and further the surface area of the pores 600Å or smaller in diameter is markedly increased in the step of kneading although the surface area of the pores larger than 600Å in diameter does not make a large difference by the kneading treatment. In FIG. 4, it is also shown that the pore volume of the kneaded material (3), especially of the pores 600Å or smaller in diameter, is increased. In addition, in each of the data shown in FIGS. 3 and 4, no additive was contained in (1) and (2), but (3) and (4) contained 10% (as alumina) by weight of alumina sol on the basis of dry sepiolite.

The above-mentioned kneading can be carried out by an ordinary kneader, roll mill or molding machine such as an extruder, and may be done by any other means which can untie the sepiolite fibers to separate fibers in the presence of water. The purpose of the kneading is to increase the specific surface area and the pore volume of the sepiolite to be treated, and the method and period of time for the kneading can be determined according to the properties of the resulting molded product, the properties of the raw material, the presence or absence of additives, the properties of the moist material, the type of the kneader, and the like. Incidentally, the kneaded material can be again subjected to moisture conditioning, if necessary, to adjust the water content thereof to a suitable molding condition.

The sepiolite material which was subjected to kneading and moisture conditioning is air-dried and/or baked at a temperature below 1,000° C. The moist sepiolite material can be subjected to the air-drying and/or baking in the form of mass or after molding it by conventional molders such as extruders and tableting machines. The massive material which was air-dried and/or baked can be ground to a desired particle size to use in a slurry or paste form. The shape and size of the resulting catalyst is determined according to the purposes of use and process. The crushing strength of the resulting catalyst can also be controlled to meet the condition of use by selecting a suitable method for preparation and a suitable temperature of drying and baking.

The present inventors found that the properties of the molded sepiolite can be further improved by incorporating the following additives in the sepiolite material in the course of molding.

Mainly for the purpose of enhancing the crushing strength of the resulting catalyst, one or more additives selected from the following additives can be added to sepiolite:

(a) aluminum hydroxide sol, alumina silica sol, silica sol, other aluminum-containing substance, and other silica-containing substance;

(b) bauxite, kaoline, montmorillonite, allophane, bentonite, attapulgite, and other clay minerals; and (c) higher alcohols, esters, ethers, urea, starch sucrose and organic molding auxiliaries.

These additives are employed to enhance the crushing strength of the resulting catalyst and may also be incorporated as a filler. Some of these additives may have a good effect on the properties and activity of the resulting catalyst when a suitable condition of preparing the catalyst is selected. In general, the compounds of the above-mentioned group (a) give sepiolite some thermal stability and the compounds of the above-mentioned group (c) can smooth the operation of kneading and molding.

As for the amounts of the additives to be added for these purposes, the compounds of the group (a) are generally added in an amount of 0.5 to 90% (as anhydrous oxide) by weight, preferably 1 to 80% by weight and most preferably 1 to 20% by weight. The compounds of the group (c) are generally added in an amount of 1 to 30% by weight. The kind and amount to be added of these additives can be determined in consideration of the purpose of employing the resulting catalyst, and these additives may be added to sepiolite in a large excess if so required. The additives selected from each of the groups (a), (b) and (c) can be used in combination to enhance the various effects on the resulting catalyst. These additives are generally added to sepiolite in the course of kneading in the form of ground powder or paste, and may be admixed to sepiolite prior to supporting metals such as Co and Ni on sepiolite.

Besides these additives, to the sepiolite mixture may be added the compounds which were to be employed in the pre-treatment of sepiolite (which is a preferred treatment of sepiolite and is explained below in detail such as inorganic acids, organic acids, metallic acids, ammonium salts thereof, salts of ammonia derivatives, or magnesium salts. Of course, it is not necessary to add the compounds when the compounds employed in the pre-treatment remain in the sepiolite material.

Figure 5:
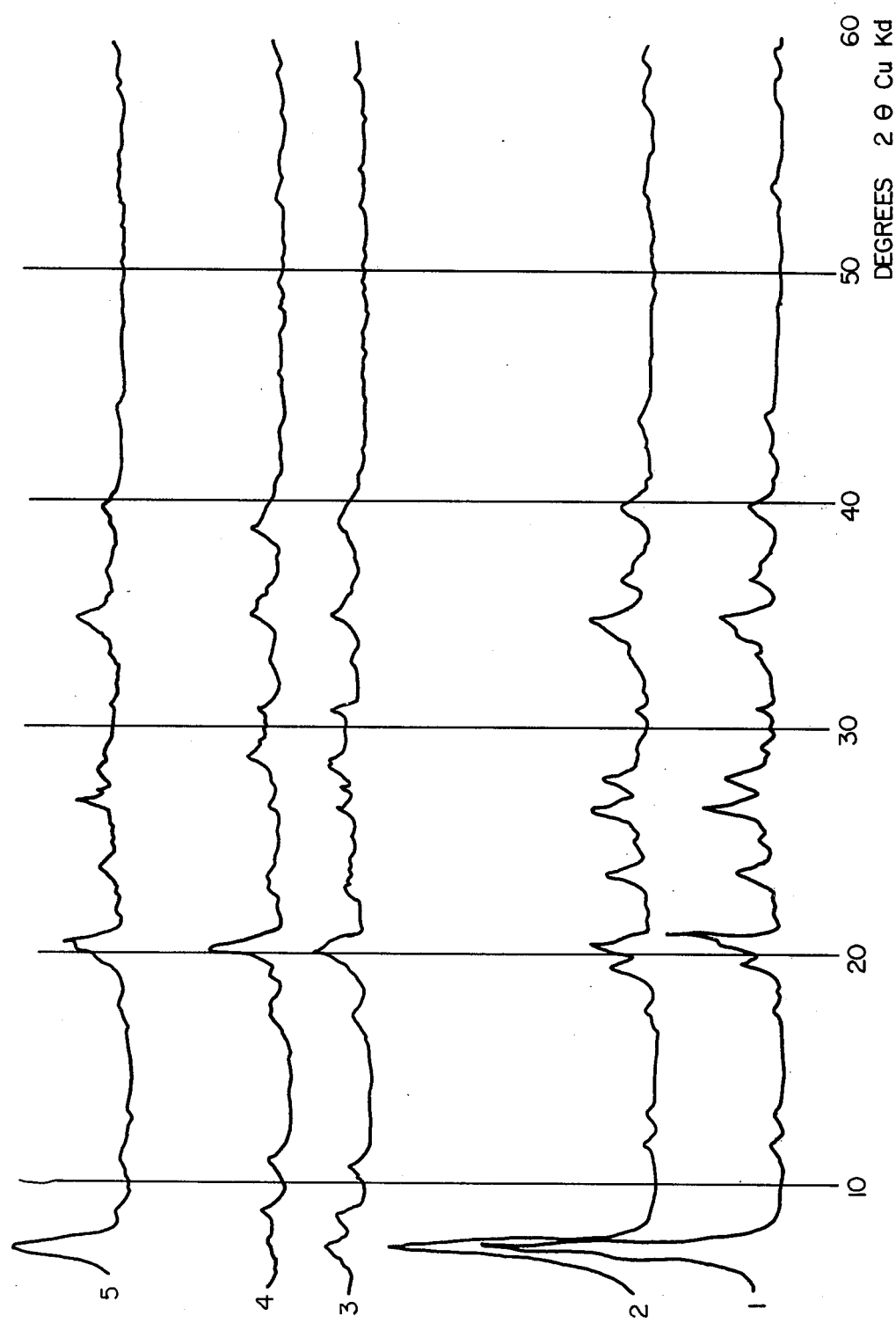
FIG. 5 show the changes in the results obtained by X-ray diffraction tests of the starting material sepiolite and the sepiolite which was not incorporated with additives and baked at 250° C., 450° C. or 650° C., incomparison with the result by the test of the molded product (calcined at 500° C.) which was prepared according to the present invention.

The common effect obtained by addition of these additives is that a very excellent thermal stability is exhibited when molded materials containing the additives are subjected to calcining or sintering, in comparison with the case where no additives are added. This effect is concretely indicated by an increase in strength, an increase in pore volume and the like, but most distinctly exhibited by the X-ray diffraction of the sintered product from the viewpoint of its structure. As shown in the graph of FIG. 5, the results of X-ray diffraction of the raw sepiolite (1) air-dried at room temperature and the sepiolite (2) dried at a relatively low temperature of 250° C. indicate substantially the same patterns. While, in the X-ray diffraction of the sepiolite (3) or (4) calcined at 450° C. or 650° C., a peak in the neighborhood of $2\theta=7°$ disappears and the changes in other small peaks are observed. In the case of the molded product (5) which was prepared by adding the additives to the same sepiolite and calcining at 500° C., the peak in the neighborhood of $2\theta=7°$ does not disappear remaining as it is and other small peaks are more similar to those of (1) and (2) than (3) and (4). From those results, it is clear that the additives have some effects on the thermal stability of sepiolite.

The effects of some of the additives on the molded products are more concretely explained as to each group of the additives in the following.

The additives shown in the groups (a) and (b) serve to enhance the crushing strength of the molded products, without substantially decreasing the pore volume. Especially, aluminium salts of the group (a) serves to markedly decrease the large pores 400Å or more in diameter in the pore distribution and to increase the pore volume within the range of pores 400Å or less in diameter. Furthermore, the addition of the aluminium salts results in the marked enhancement of crushing strength of the resulting molded product, even in a very small amount. The presence or formation of acids in the sepiolite mixture results in the especially sharp distribution of pores. Such sharp distribution is also obtained by addition of the metal salts. These additives can be added to sepiolite in the course of grinding, moisture conditioning or kneading, alone or together with the additives of the other group shown above.

In the preparation of the catalyst using a sepiolite carrier for hydrotreating according to the present invention, the following pretreatment step can be employed to enhance the catalytic properties and to improve the method for preparation of the catalyst.

A small amount of impurites such as calcium carbonate, magnesium carbonate and magnesium-calcium carbonate may be contained in the sepiolite generally employed. Although some of these impuri ies are removed in the course of the metal-supporting step using an acidic aqueous solution, the remaining impurities may have an adverse effect on the activities of the resulting catalyst, especially on the hydrogenation activities thereof such as those of desulfurization and denitrification. Further, the presence of these impurities results in decrease in the crushing strength of the resulting catalyst since some of the impurities are dissolved in the course of the metal-supporting step. Also, a further complicated treatment is required to recover the waste liquid in which these impurites were dissolved, in the metal-supporting step.

The pretreatment step employed in the present invention has substantially eliminated the above-mentioned defects.

In the pretreatment step, is employed an aqueous solution containing one or more of the compounds selected from magnesium salts, inorganic acids such as mineral acids and carbonic acid, organic acids, ammonium salts and salts of ammonia derivatives. Incidentally, the mineral acids include nitric acid sulfuric acid, hydrochloric acid, phosphoric acid and the like. The organic acids include formic acid, oxalic acid, acetic acid, tartaric acid and the like. Carbonic acid is usually employed in the form of an aqueous solution in which carbon dioxide was dissolved under normal or higher pressure. The ammonium salts include ammonium nitrate, ammonium salfate, ammonium phosphate, ammonium carbonate, ammonium oxalate, ammonium acetate, ammonium tartarate, and the like. The salts of ammonia derivatives include trimethylamine hydrochloride, aniline hydrochloride and the like.

The composition and concentration of these treating liquids are not especially restricted. It is generally effective to employ a solution having a pH in the range of 1 to 7, but an acidic solution of lower than pH 1 may be used at a low temperature and with a short-time treatment.

The pretreatment is not especially restricted as to the temperature and time of the treatment, and is generally carried out at a temperature blow 100° C. and for more than several minutes. The pretreatment may be performed in a shorter time depending on the properties of sepiolite to be treated.

In the course of the pretreatment, magnesium elutes in the treating solution, and the amount of the magnesium eluted depends on the treating condition of sepiolite. In general, the lower the pH of the treating solution is; the longer the treating time is, or the higher the treating temperature is, the larger the amount of magnesium to be eluted becomes.

The present inventors have found that magnesium to be eluted comes from magnesium hydroxide, magnesium carbonate and dolomite components which are present as impurities in sepiolite, by observing the state of sepiolite before and after the pretreatment was effected. Thus, the present inventors have got information that one of the reasons that the pretreatment has good effect on the subsequent metal-supporting step is due to the elution of most of the impurities from sepiolite.

The present inventors have further found that the properties of the resulting sepiolite catalyst, such as physical property, activity, reaction selectivity and lifetime, depend largely on the preparation process such as method of supporting metals, method of pretreating sepiolite and method of molding.

A method for preparation of the catalyst based on the effective combination of the above-mentioned steps is illustrated in the following.

In case that a metal or metals such as Co and Ni are supported on sepiolite by way of ion-exchange reaction, the pore volume and specific surface area of the sepiolite are decreased owing to a phenomenon which has not yet been solved but is presumed to be due to electrostatic intermolecular force. Accordingly, the overall performance of the catalyst for hydrotreating hydrocarbons is not satisfactorily exhibited, although the activity of catalytic metal is increased by employing the ion-exchange method.

A metal on sepiolite-catalyst which is satisfied with the requirements for pore volume and specific surface area and contains the supported metal or metals exhibiting an excellent catalytic activity, can be obtained by the following procedure. Before having a metal or metals supported on sepiolite, water is added to sepiolite. The mixture is subjected to a sufficient kneading or mastification to obtain a carrier material having such pore volume and specific surface area as are desirable for a catalytic carrier, followed by adjusting the water content thereof. The sepiolite thus treated is, as it is or after molding, subjected to drying, baking or calcining to fix the desired pore volume and specific surface area obtained by the kneading. The resulting sepiolite is treated with an acidic solution containing a metal or metals such as Co and Ni according to the ion-exchange method, to have the metal supported thereon.

The method for preparation of the present catalyst comprises the step of keading or calcining and the subsequent step of supporting one or more metals, although these two steps can also be carried out in the reverse order.

In this method, it is essential that the baking or calcination should be carried out at a temperature of lower than about 400° C. When the calcination is carried out at a temperature of higher than about 400° C., some changes will be brought about in a part of sepiolite owing to fusion and the like and the amount of the catalytic metal such as Co and Ni, supported according to the ion-exchange method, may be decreased.

It is to be noted that the pore volume contracts in the course of the metal-supporting step. The present inventors have found that this phenomenon of contraction takes place in a relatively low degree in the pores smaller than several hundreds $\text{Å}$ in diameter, but is markedly exhibited in the pores in the range of several hundreds to several thousands $\text{Å}$ in diameter.

Therefore, by utilizing such phenomena advantageously, an excellent catalyst having high activity can be prepared in accordance with the purpose of catalyst and the properties of hydrocarbons to be treated.

For example, a catalyst having a high ratio of large pores several hundreds to several thousands $\text{Å}$ in diameter possesses a large pore volume but a small packing density; accordingly, the specific surface area per packing volume becomes smaller. In accordance with researches made by the present inventors, such catalyst possesses a longer lifetime, especially in hydrotreating heavy oils, since clogging of pores owing to deposition of metals and the like is much reduced, but its activity is lowered; therefore, it is necessary to make the ratio of large pores as small as possible by controlling the pore volume to such a suitable extent that clogging of pores can be regulated.

When a heavy oil having a large metal content as much as 500 ppm to 1,000 ppm is treated mainly for the purpose of demetallization, it is desirable to employ a catalyst having a high ratio of large pores. But in case of hydrotreating a usual heavy oil containing metals as much as several hundreds ppm, a treated oil containing very small amounts of metal and sulfur can be obtained by using a catalyst with higher activity in which the ratio of large pores is reduced.

When it is intended to prepare a catalyst having a relatively high ratio of large pores for treating heavy oils containing a very large amount of metals, such catalyst can be obtained by selecting the conditions of kneading and moisture conditioning in such a way as to spread the pore distribution towards larger pores, although some of the large pores may be eliminated by means of the treatment with acids or ammonium salts, or the metal (Co, Ni, etc.)—supporting treatment.

Alternatively, the above-mentioned method can be carried out in the reverse order, that is, in the order of the metal-supporting step and the subsequent kneading, molding and/or baking (or calcination) step. According to this method, a metal on sepiolite-material is incorporated with water, the resultant mixture is subjected to kneading or mastification, and then the water content thereof is adjusted, if desired followed by molding; whereby it is possible to recover the pore volume and specific surface area which were reduced in the course of ion-exchange treatment. Thus, a catalyst having a large pore volume and specific surface area can be obtained. A catalyst having a larger pore volume and specific surface area can be obtained by selecting suitable conditions of these treatments. When calcination or sintering is carried out after kneading or molding step in the process, it can be effected at a temperature of lower than about 1,000° C.

As described above, by treating sepiolite in accordance with the suitable and selected combination of the metal-supporting, kneading, molding, calcination and/or pretreatment, can be obtained a catalyst which is very effective for hydrotreating hydrocarbons and especially for demetallization, desulfurization and denitrification.

In addition, a catalyst having an excellent demetallization activity can be obtained by simply mixing the catalyst of the present invention with a used catalyst containing one or more metallic compounds of which metal or metals are selected from the transition metals and the IIb group metals of the periodic table. In this case, if so desired, the used catalyst may be ground and sepiolite may be subjected to grinding, moisture conditioning, molding or the pretreatment.

Of course, the metal on sepiolite-catalyst of the present invention has an excellent demetallization activity. A demetallization activity can be exhibited by employing a mixture of the catalyst of the present invention and a conventional catalyst for hydrogenation, or the catalyst comprising metal or metals supported on a mixture of sepiolite and a conventional carrier material. In case of adding sepiolite to a conventional carrier material and mixing them to provide the resulting catalyst with demetallization activity, the amount of sepiolite in the mixture is generally more than about 5% by weight for enhancing the demetallization activity of the resulting catalyst to some extent, and more than about 20% by weight for obtaining an excellent demetallization activity. Therefore, it is to be noted that a catalyst comprising the metal or metals supported on a mixture of sepiolite and the other carrier material is also included in the scope of the present invention.

Incidentally, it is to be noted that as a result of concomitantly employing sepiolite and other conventional carrier material as described above, the activity and lifetime of the resulting catalyst are enhanced as well as the cost of carrier is lowered in comparison with those of the conventional carrier, since sepiolite has a large pore volume and is available at a lower price than some of the conventional carrier materials.

The catalyst of the present invention can be employed in a very wide variety of hydrotreating reaction and for a very wide range of hydrocarbons. The catalyst is very useful for desulfurization, denitrification and hydrogenation of light oils such as gasoline and kerosine, and also for demetallization, deasphalteninng, desulfurization, denitrification, hydrogenation and hydrocracking of heavy oils such as vacuum gas oils, tar sands and bitumens.

Since the catalyst of the present invention is effective for various hydrotreating methods and a very wide range of hydrocarbons, a broad range of reaction conditions can be employed. But, the partial pressure of hydrogen is generally in the range of about 10 to about 350 atmospheric pressure and preferably about 15 to 300 atmospheric pressure, and the reaction temperature is generally in the range of about 200 to about 470° C. and preferably about 200° C. to about 450° C. These reaction conditions can be optionally selected according to the properties of hydrocarbons, the purpose of hydrotreating, the method of reaction and the like. In the same way, a conventional method of reaction can be employed in the present invention. For example, a conventional flow-type fixed bed, moving bed or fluidized bed reactor can be advantageously employed.

The metal on sepiolite-catalyst of the present invention is characterized in that the demetallization ratio is selectively enhanced by hydrotreating hydrocarbons under the condition of high partial pressure of hydrogen sulfide. When hydrocarbons are hydrotreated in the presence of a conventional catalyst for desulfurization, it is known that in the atmosphere of high partial pressure of hydrogen sulfide, the catalyst is poisoned by hydrogen sulfide to gradually decrease the desulfurization activity of the catalyst. It is also known that demetallization ratio is accordingly lowered as the desulfurization activity is lowered. Contrary to the conventional technical knowledge, the demetallization activity of the metal on sepiolite-catalyst is markedly enhanced as the treating time elapses in the reaction system substantially containing pressure of hydrogen sulfide, although its desulfurization ratio is gradually lowered. Accordingly, the proportion of demetallization ratio to desulfurization ratio becomes gradually larger as the reaction time passes, and as a result a selective demetallization reaction takes place. In this case, the reaction is effectively carried out under partial hydrogen pressure of more than about 10 kg/cm$^2$ and preferably more than about 30 kg/cm$^2$.

By utilizing such unique properties of the metal on sepiolite-catalyst of the present invention, an efficient desulfurization process can be carried out combining two reaction steps, one being under high partial pressure of hydrogen sulfide and the other being under rather low partial pressure thereof.

The reaction process comprises the first step in which a selective demetallization of hydrocarbon is carried out under high partial pressure of hydrogen sulfide followed by removing hydrogen sulfide gas dissolved in the hydrocarbons thus treated and the subsequent second step in which desulfurization of the resulting hydrocarbons is carried out under rather low partial pressure of hydrogen sulfide. Thus, in the second step, a rapid decrease in catalyst activity owing to deposition of metal on the catalyst is avoided, and the activities of the catalyst can be advantageously and fully utilized. Incidentially, the hydrogen sulfide gas which was generated in the second step can be recovered together with hydrogen gas and recycled to the first step for reuse. The hydrotreating conditions in the first and second steps are determined according to the kind of the hydrocarbon to be treated. The same conditions may be applied to the both steps, and the reactions are generally carried out under hydrogen pressure of about 10 to about 350 kg/cm$^2$ and at a temperature of about 300° to about 500° C.

The present invention will be further explained by way of the following examples. The percentage (%) and ratio (ppm) employed in the examples are based on weight unless otherwise specified.

EXAMPLES 1–18

A sepielite carrier was obtained by drying a sepiolite mineral of Spanish product at 120° C. for 2 hours and regulating the particle size thereof within the range of 20 to 6 mesh of US Standard Sieve. The carrier had a specific surface area of 82 cm$^2$/g and a pore volume of 0.57 cc/g (the carrier dried at 200° C. was measured according to mercury porosimeter method). The sepiolite carrier was impregnated in an aqueous solution of nitrate or chloride of the catalytic metals shown in the following Table 1 (for example, aqueous solutions of ammonium vanadate, ammonium paramolybrate and sodium silicotungstate for vanadium, molybdenum and tungsten, respectively), by means of a conventional impregnating method to have the metal supported on the carrier, followed by calcining at 500° C. to obtain a catalyst. When two or more metals were to be supported on the carrier, a multistage impregnating method was employed with one stage for each metal.

By employing each of these catalysts, a topped residual oil containing 150 ppm of vanadium, 41 ppm of nickel, 3 ppm of iron and 2.87% of sulfur was subjected to hydrotreating by using a high pressure flow-type reactor, under hydrogen pressure of 140 kg/cm$^2$ at a reaction temperature of 415° C. and a liquid space velocity of 1.0 Hr$^{-1}$ with upward flow. The devanadiuming (removal of vanadium) ratio (DVR), desulfurization ratio (DSR) and the like, 50 hours after starting the reaction were measured to determine the reaction activities of the catalysts. The results are shown in Table 1.

Table 1

| Example Nos. | amount of metal kind | Catalytic metal activity (as elemental metal) | Catalytic DVR | DSR |
|---|---|---|---|---|
| 1 | no additive | 0 | 7% | 1% |
| 2 | Cu | 0.7 | 69 | 18 |
| 3 | Co | 1.3 | 73 | 20 |
| 4 | Ni | 3.0 | 75 | 24 |
| 5 | Mo | 2.0 | 54 | 21 |
| 6 | W | 2.0 | 44 | 15 |
| 7 | V | 2.0 | 37 | 10 |
| 8 | Sm | 1.9 | 75 | 17 |
| 9 | Dy | 2.3 | 73 | 17 |
| 10 | Zn | 2.7 | 52 | 11 |
| 11 | Zr | 1.2 | 58 | 13 |
| 12 | Mo | 1.1 | 40 | 15 |
| 13 | Cu+Mo | Cu;1.2,Mo;3.1 | 82 | 32 |
| 14 | Co+Mo | Co;0.8,Mo;2.7 | 88[(1)(2)] | 47 |
| 15 | Cu+Ni | Cu;0.7,Ni;1.5 | 77[(1)(3)] | 24 |
| 16 | Zn+V | Zn;2.5,V;10.3 | 79 | 46 |
| 17 | Cu+Mn | Cu;5.0,Mn;4.2 | 81 | 23 |
| 18 | Dy+Ni+Mo | Dy;2.3,Ni;0.5,Mo;3.0 | 90[(1)(4)] | 61 |

[(1)] deironing (removal of iron) ratio 83–67%
[(2)] denickeling (removal of nickel) ratio 61%
[(3)] denickeling (removal of nickel) ratio 66%
[(4)] denickeling (removal of nickel) ratio 73%

EXAMPLES 19–21

On the same dried sepiolite as used in Examples 1–18 was sprayed a mixed solution of a mixture of cobalt nitrate, nickel nitrate and ammonium paramolybdate dissolved in an ammonia water to have the metals supported thereon. The catalysts having different amounts of the metals supported were obtained by varying the concentration of the ammonium aqueous Co-Ni-Mo solution. After the catalysts thus obtained were calcined at 500° C. for 2 hours, the activity of each catalyst was tested by using the same reaction apparatus and residual oil as employed in Examples 1–18. Reaction was carried out under the reaction conditions of hydrogen pressure of 140 kg/cm$^2$, a reaction temperature of 400° C., and a liquid space velocity of 2.0 Hr$^{-1}$ with upward flow.

The reaction activities of the catalysts 50, 500 and 1,000 hours after starting the reaction were determined by measuring devanadiuming ratio (DVR) and desulfurization ratio (DSR). The results are shown in Table 2.

Table 2

| | Catalytic metal composition | | | Activity of catalyst | | | | | |
|---|---|---|---|---|---|---|---|---|---|
| | | | | after 50 hours | | after 500 hours | | after 1,000 hours | |
| Example Nos. | Co (%) | Ni (%) | Mo (%) | DVR (%) | DSSR (%) | DVR (%) | DSR (%) | DVR (%) | DSR (%) |
| 19 | 1.6 | 0.5 | 4.0 | 64 | 24 | 61 | 21 | 52 | 20 |
| 20 | 3.5 | 1.1 | 7.2 | 73 | 32 | 70 | 29 | 62 | 22 |
| 21 | 4.3 | 1.6 | 11.3 | 78 | 39 | 72 | 31 | 63 | 20 |

It is clear from the results shown in the table above that demetalization activity is enhanced as the amount of the metals supported on the carrier increases.

REFERENCE EXAMPLES 1–4

These reference examples are intended to compare the catalytic activity of the present catalyst with those of the conventional desulfurization catalysts.

The same residual oil as used in Examples 19–21 was subjected to hydrotreating by useng each of the conventional desulfurization catalysts for heavy oils, i.e. an activated bauxite catalyst and a red mud catalyst, under the same conditions as in Examples 19-21. The desulfurization catalysts for heavy oils employed herein comprised from 3 to 3.5% of cobalt and 8 to 10% of molybdenum (these percentages are based on the elemental metals) supported on alumina. The red mud catalyst was a spheric catalyst 1.5 mm in diameter while the activated bauxite catalyst had particle sizes of 6 to 20 mesh.

The catalytic activity of each catalyst is shown in Table 3. Also are shown in the table 3 the physical properties of each catalyst measured according to mercury porosimeter method, said properties being related to the pores 78Å or more in diameter.

It is apparent from the above results that the proportion of desulfurization ratio to demetallization ratio increased with the decrease in the proportion of sepiolite to alumina.

EXAMPLES 25-27

Each of the metals listed in Table 5 was supported on a sepiolite carrier in an amount of 1.0% (as metal). Namely, the carrier was subjected to a conventional impregnating method using an aqueous solution of the chloride or nitrate of each metal. Each of the metal on sepiolite-materials was calcined at 500° C. for 2 hours to obtain a catalyst. By using each of the catalysts thus obtained, topped resudial oil containing 150 ppm of Table 3

| Reference Example Nos. | Catalyst employed | Catalytic activity | | | | | | physical property of catalyst | |
|---|---|---|---|---|---|---|---|---|---|
| | | after 50 hours | | after 100 hours | | after 1,000 hours | | pore volume (cc/g) | specific surface area ($m^2/g$) |
| | | DVR (%) | DSR (%) | DVR (%) | DSR (%) | DVR (%) | DSR (%) | | |
| 1 | desulfurization catalyst | 64 | 75 | 40 | 46 | 13 | 22 | 0.40 | 168 |
| 2 | desulfurization catalyst | 69 | 73 | 58 | 55 | 29 | 35 | 0.66 | 160 |
| 3 | red mud catalyst* | 24 | 5 | 22 | 6 | 19 | 4 | 0.18 | 9 |
| 4 | activated bauxite | 41 | 12 | 34 | 8 | 28 | 7 | 0.25 | 32 |

*When a red mud catalyst is employed, reaction must be generally carried out at 420° C. or higher, the temperature being higher than the case where a cconventional desulfurization is employed. In order to compare the catalyst with those of the present invention, however, the reaction was carried out at 400° C.

EXAMPLES 22-24

Each of 80:20, 50:50, and 20:80 mixtures of a sepiolite mineral of Spanish product and a commercial available boehmite alumina was ground to particles 1 to 200μ in size, and admixed with 3% (as anhydride) of an aluminium hydroxide sol. The water content of the resultant mixture was adjusted, followed by molding into cylindrical pellets 0.8 to 1.0 mm in diameter by an extruder. Each of the pellets was air-dried, and then calcined at 500° C. for 2 hours to obtain a catalyst carrier.

Catalysts were prepared by having copper, cobalt and molybdenum supported on the carriers in the same way as in Examples 19-21, followed by calcined at 500° C. for 2 hours.

The catalytic activities of the catalysts thus prepared were tested under the same conditions as in Examples 19-21, at hydrogen pressure of 140 kg/cm², reaction temperature of 400° C., and liquid space velocity of 2.0 Hr⁻¹, in the same way as in Examples 19-21.

The results of the test 50 hours after starting the reaction are shown in Table 4. Also are shown in the table the pore volumes and the specific surface areas of the pores 78Å or more in diameter contained in the catalysts which are measured according to mercury porosimeter method.

vanadium and 2.87% of sulfur was subjected to hydrotreating at hydrogen pressure of 140 Kg/cm² and reaction temperature of 400° C. The results are shown in Table 5.

Table 5

| | Catalyst | | Catalytic activity | |
|---|---|---|---|---|
| Ex. Nos. | pore volume of carrier (cc/g) | metals supported | devanadiuming ratio (%) | desulfurization ratio (%) |
| 25 | 0.6 | Cu + Zn | 71 | 9 |
| 26 | 0.6 | Ag | 42 | 10 |
| 27 | 0.6 | Sm | 72 | 15 |

EXAMPLES 28-31

On each of the catalysts obtained in Examples 25, 26 and 27 was additionally supported Mo, Co or a mixture of Mo and Co in the amount (as metal) of 5%, 1.5% or 6.5% (Mo: 5%+Co:1.5%) of the weight of the anhydrous carrier, respectively, by soaking each catalyst in an aqueous solution of ammonium molybdate and/or cobalt nitrate in one stage, followed by calcined at 500° C. for 2 hours. By employing each of the catalysts thus obtained, the same residual oil as used in Examples 25-27 was subjected to hydrotreating under the same conditions as in these examples. The results are shown in Table 6.

Table 4

| Example Nos. | Sepiolite to alumina ratio | Metals supported (as metal) | | | Catalytic activity | | Physical property of catalyst | |
|---|---|---|---|---|---|---|---|---|
| | | copper (%) | cobalt (%) | molybdenum (%) | DVR (%) | DSR (%) | pore volume (cc/g) | specific surface area ($m^2/g$) |
| 22 | 80:20 | 1.4 | 3.2 | 7.5 | 79 | 42 | 0.53 | 101 |
| 23 | 50:50 | 1.1 | 3.3 | 7.7 | 77 | 58 | 0.47 | 113 |
| 24 | 20:80 | 1.5 | 3.2 | 7.8 | 75 | 73 | 0.41 | 127 |

Table 6

| Example Nos. | Catalyst supporting catalyst (shown by Example Nos.) | metals supported | Catalytic activity devanadiuming ratio (%) | desulfurization ratio (%) |
|---|---|---|---|---|
| 28 | 25 | Mo + Co | 88 | 59 |
| 29 | 25 | Mo | 86 | 35 |
| 30 | 26 | Co | 69 | 23 |
| 31 | 27 | Mo + Co | 84 | 58 |

EXAMPLE 32

As a sepiolite carrier, was employed a sepiolite mineral of Spanish product which had been regulated to have particle sizes within the range of 10 to 16 mesh. After drying at 200° C. for 2 hours, the sepiolite was soaked in the aqueous solution of copper nitrate (pH 3.0) containing 0.5 mol/l of $Cu^{2+}$, held at 60° C. for 3 hours and then taken out from the solution, and rinsed with warm water until no coloring due to the presence of $Cu^{2+}$ ions was observed in the rinsings. The analysis of the resultant copper on sepiolite-product, which had been dried at 200° C., showed that it contained 1.7% of Cu (as metal).

The dried copper on sepiolite-product was then soaked in an aqueous ammonium solution of ammonium paramolybdate and cobalt nitrate, followed by calcining at 500° C. for 2 hours. The analysis of the resultant Cu-Co-Mo on sepiolite-catalyst showed that it contained 3.4% of cobalt and 7.9% of molybdenum (as metals).

By using the catalyst thus obtained, a topped residual oil containing 2.62% of sulfur, 3,600 ppm of nitrogen, 3.2% of n-heptane-insoluble matter was subjected to hydrotreating using a conventional high pressure flow-type reactor at hydrogen pressure of 140 kg/cm², reaction temperature of 400° C., and liquid space velocity of 0.5 $Hr^{-1}$. The treated oil 100 hours after starting the reaction was analysed. The results are shown in Table 7.

Table 7

| | Results analysed | | | |
|---|---|---|---|---|
| | S % | $N_{ppm}$ | $V_{ppm}$ | $Ni_{ppm}$ | asphaltenes % |
| treated oil | 0.8 | 2,600 | 6 | 1 | 0.5 |
| residual oil | 2.62 | 3,600 | 130 | 34 | — |

Reference Example 5

A Cu, Co and Mo on sepiolite-catalyst was prepared by impregnating the same sepiolite as used in Example 32 in an aqueous ammonium solution containing ammonium paramolybdate, cobalt nitrate and copper nitrate according to a conventional impregnating method. The analysis of the catalyst after sintering showed that 2.0% of copper, 3.3% of cobalt and 8.2% of molybdenum were supported thereon.

By using the catalyst thus obtained, hydrotreating was carried out by employing the same starting material, apparatus and reaction conditions as employed in Example 32. In Table 8 are shown the results of the analysis of the treated oil together with those of Example 32 for comparison.

Table 8

| Catalyst | Results analysed | | | | |
|---|---|---|---|---|---|
| | S % | N ppm | V ppm | Ni % | Asphaltene % |
| Reference Example 5 | 1.2 | 3,100 | 15 | 12 | 0.7 |
| Example 32 | 0.8 | 2,600 | 6 | 1 | 0.5 |

EXAMPLES 33–39

A metals on sepiolite-catalyst was prepared by repeating the procedure of Example 32 except changing the treating solutions of the metal compounds to be used in the first step and the second step. In the first step, the dried sepiolite was treated to have 1 to 3% of Fe, Ni, Zn, Sm or La supported thereon by using a corresponding aqueous solution of ferric sulfate, nickel nitrate, zinc chloride, samarium chloride, or lanthanum chloride. Then, in the second step, each of the resultant metal on sepiolite-base catalyst was further treated to have two or three of Mo, W, V, Co, Ni, and Cu supported thereon by using an aqueous ammonium solution of the corresponding two or three compounds selected from ammonium paramolybdate, ammonium, paratungstate, ammonium vanadate, cobalt nitrate, nickel nitrate and copper nitrate.

By using each of the catalysts thus obtained, hydrotreating was carried out by employing the same residual oil and the same reaction conditions as in Example 32. The results of the analysis of produced oil 100 hours after starting the reaction are shown in Table 9.

Table 9

| Example Nos. | Catalytic metal | | | | Result analysis of treated oil | |
|---|---|---|---|---|---|---|
| | first step | | second step | | | |
| | catalytic metal | amount of metal (%) | catalytic metal | amount of metal (%) | S (%) | V (ppm) |
| 33 | Fe | 2.3 | Co | 1.2 | 1.6 | 13 |
| | | | Mo | 2.7 | | |
| | | | Co | 1.5 | | |
| 34 | Ni | 1.9 | Mo | 2.6 | 1.2 | 11 |
| | | | Cu | 1.0 | | |
| 35 | Ni | 1.9 | Co | 0.7 | 1.7 | 3 |
| | | | Mo | 11.7 | | |
| 36 | Zn | 1.1 | Co | 1.2 | 1.5 | 24 |
| | | | V | 7.2 | | |
| 37 | Sm | 0.7 | Co | 2.3 | 1.4 | 21 |
| | | | Mo | 4.1 | | |

Table 9-continued

| | Catalytic metal | | | | Result analysis of treated oil | |
|---|---|---|---|---|---|---|
| | first step | | second step | | | |
| | | amount of | | amount of | | |
| Example Nos. | catalytic metal | metal (%) | catalytic metal | metal (%) | S (%) | V (ppm) |
| 38 | La | 1.2 | Co | 1.5 | 0.8 | 4 |
| | | | W | 10.9 | | |
| | | | Ni | 3.4 | | |
| 39 | La | 1.2 | Co | 1.8 | 0.5 | 1 |
| | | | Mo | 14.9 | | |
| residual oil | | | | | 2.62 | 130 |

EXAMPLE 40

A sepiolite of Spanish product was employed as the starting material after regulating the particle sizes thereof within the range of 10 to 16 mesh. The sepiolite was dried at 120° C. for 2 hours, impregnated in the aqueous solution containing 0.01 mol/l of ammonium nitrate, and then allowed to stand at room temperature for a whole day and night. After the sepiolite treated with ammonium nitrate was thoroughly washed with water, the moist sepiolite was soaked in the aqueous solution containing 0.01 mol/l of copper nitrate, and then allowed to stand at room temperature to have copper supported thereon. The resultant copper on sepiolite-material was washed with warm water and then with 10% ammonia water to remove unexchanged copper ions and magnesium ions. The analysis of the resultant sepiolite material, which had been dried at 200° C. for 2 hours, showed that 2.1% of copper (as the oxide) was contained therein.

The copper on sepiolite-material was then impregnated in the aqueous solution containing 16% of ammonium paramolybdate and 10% of ammonia to have molybdenum supported thereon. The sepiolite material thus treated was dried at 120° C. for 2 hours, and calcined at 500° C. for 1 hour. The analysis of the resultant catalyst showed that 2.2% of CuO and 8.6% of $MoO_3$ were contained therein.

By using the catalyst thus obtained, a topped residual oil containing 2.62% of sulfur, 3,600 ppm of nitrogen, 3.2% of n-heptane-insoluble matter, 130 ppm of vanadium and 34 ppm of nickel was subjected to hydrotreating at hydrogen pressure of 140 kg/cm², reaction temperature of 400° C., and liquid space velocity of 0.5 $Hr^{-1}$. The analysis of the treated oil 100 hours after starting the reaction showed that the amounts of the impurities in the residual oil were decreased to 0.70% of sulfur, 2,400 ppm of nitrogen, 6 ppm of vanadium, 5 ppm of nickel and 0.5% of n-heptane-insoluble matter.

EXAMPLE 41

The same sepiolite as used in Example 40 was dried at 120° C. for 2 hours, then impregnated in the aqueous solution containing 0.1 mol/l of ammonium chloride and 0.1 mol/l of cobalt nitrate, and allowed to stand at room temperature for 5 hours to have cobalt supported thereon.

The resultant cobalt on sepiolite-material was washed thoroughly with warm water to remove unexchanged cobalt ions and magnesium ions therefrom, followed by drying at 200° C. for 2 hours. The dried material was impregnated with the aqueous solution containing 10% of ammonium paramolybdate and 10% of ammonia, and then dried at 120° C. for 2 hours. The analysis of the catalyst thus obtained showed that 1.3% of CoO and 6.5% of $MoO_3$ were contained therein.

By employing the catalyst, the same residual oil as used in Example 40 was subjected to hydrotreating using the same apparatus as in Example 40. Reaction conditions were identical with those of Example 40 except that the liquid space velocity was changed to 1.0 $Hr^{-1}$. The analysis of the treated oil 100 hours after starting the reaction showed that the amounts of sulfur and vanadium were decreased to 1.57% and 36 ppm, respectively.

EXAMPLE 42

The same sepiolite as used in Example 40 was dried at 120° C. for 2 hours and then incorporated with the aqueous solution containing 0.1 mol/l of acetic acid, followed by thoroughly stirring the mixture for about 2 hours. To the sepiolite thus treated with acetic acid was added the aqueous solution containing 0.1 mol/l of lanthanum nitrate and 0.02 mol/l of nickel nitrate. The resultant mixture was allowed to stand for about 3 hours to obtain lanthanum and nickel on sepiolite material, which was sufficiently rinsed with warm water and then dried at 200° C. for 1 hour. The analysis of the resultant dried material showed that 1.2% of $La_2O_3$ and 1.4% of NiO were contained therein.

The dried lanthanum and nickel on sepiolite material was impregnated with the aqueous solution containing 3.0% of ammonium paratungstate and 5% of ammonia and then dried at 200° C., followed by repeating the impregnating and drying, to have tungsten supported on the sepiolite material. The resultant lanthanum, nickel and tungsten on sepiolite material was calcined at 500° C. for 1 hour to obtain a catalyst for hydrotreating. The analysis of the catalyst showed that 1.1% of $La_2O_3$, 1.3% of NiO and 9.8% of $WO_3$ were contained therein.

By employing this catalyst, the same residual oil as used in Example 40 was subjected to hydrotreating by the same reaction apparatus as used in Example 40. Reaction was carried out at hydrogen pressure of 160 kg/cm², a reaction temperature of 430° C. and a liquid space velocity of 2.0 $Hr^{-1}$. The analysis of the treated oil 100 hours after atarting the reaction showed that the amounts of vanadium, sulfur and nitrogen were decreased to 19 ppm, 1.20% and 2,800 ppm, respectively. By a reduced pressure distillation of the treated oil, the fraction distillated at lower than 550° C. was obtained in the yield of 81% by volume (whereas, the same fraction yield of the feeded residual oil was 63% by volume). Thus, it is recognized that the catalyst according to the present invention has a very high activity in not only desulfurization, denitrification and demetallization but also hydrocracking of heavy oils.

EXAMPLES 43 and 44

By employing the Co and Mo on sepiolite-catalyst, a vacuum oil containing 2.0% of sulfur and a cracked gas oil having a bromine number of 26 and 2.6% sulfur (distillated at 200°-500° C.) was subjected to hydrotreating. The reaction was carried out under hydrogen pressure of 30 kg/cm$^2$, at a temperature of 380° C. and a liquid space velocity of 1.0 Hr$^{-1}$ by the same reaction apparatus as used in Example 40. The analysis of the treated oils 50 hours after starting the reactions provided the following results as shown in Table 10.

Table 10

| Example Nos. | Starting Material oils | Resuls 50 hrs. after starting reactions | |
|---|---|---|---|
| | | sulfur content | bromine number |
| 43 | vacuum gas oil | 0.50 % | — |
| 44 | cracked gas oil | 1.42 % | 12 |

From these results, it is shown that the catalyst obtained according to the present invention is effective for the desulfurization by hydrogenation of light oils as well as heavy oils and for decrease in bromine number of cracked oils by hydrogenation thereof.

EXAMPLE 45

The same sepiolite as used in Example 40 was employed as the starting material. The sepiolite was soaked in the aqueous solution containing 0.1 mol/l of magnesium nitrate and allowed to stand at room temperature for 5 hours, followed by a sufficient rinse with warm water. The rinsed sepiolite was impregnated in the aqueous solution containing 0.01 mol/l of nickel nitrate for 2 hours to have nickel supported thereon. The resultant nickel on sepiolite material was sufficiently rinsed with warm water and then with 10% ammonia water, followed by drying at 200° C. for 2 hours. The dried material was impregnated in the aqueous solution containing 4% of ammonium vanadate and 4% of ammonia and dried at 120° C. for 1 hour followed by sintering at 500° C. for 1 hour. The analysis of the resultant catalyst showed that 0.8% of NiO and 6.1% of V$_2$O$_5$ were contained therein.

By employing this catalyst, the same residual oil as used in Example 40 was subjected to hydrotreating using the same apparatus as in Example 40, under the same reaction conditions as employed in Example 41. The analysis of the treated oil 100 hours after starting the reaction showed that the sulfur and the vanadium contents were decreased to 1.64% and 34 ppm, respectively.

Reference Example 6

A Co and Mo on sepiolite-catalyst was prepared by employing as the starting material the same sepiolite as used in Example 40, by changing the process for preparation. The starting material sepiolite was impregnated in a mixed aqueous ammonium solution of cobalt nitrate and ammonium paramolybdate which had been adjusted to a predetermined concentration, followed by baking at 500° C. for 1 hour. The analysis of the resultant catalyst showed that 1.7% of CoO and 5.9% of MoO$_3$ were contained therein.

By employing this catalyst, Example 43 was repeated to subject the same vacuum distillation light oil to desulfurization. The analysis of the treated oil 50 hours after starting reaction showed that 0.97% of sulfur was contained therein.

Reference Example 7

A Co and Mo on sepiolite-catalyst was prepared in the same way as in Reference Example 6. The starting material sepiolite was dried at 120° C. for 2 hours, impregnated in the aqueous solution containing 0.1 mol/l of ammonium nitrate and 0.1 mol/l of cobalt nitrate and allowed to stand at room temperature for 5 hours. The Co on sepiolite-material as taken out without a further rinse was dried at 200° C. for 2 hours and then treated substantially in the same way as in Example 41 to have molybdenum supported thereon. The analysis of the resultant catalyst showed that 1.4% of CoO and 6.3% of MoO$_3$ were contained therein.

By employing this catalyst, Example 43 was repeated to subject the vacuum gas oil to desulfurization. The analysis of the treated oil 50 hours after starting reaction showed that 0.68% of sulfur was contained therein. From the result, it is understood that the residues of the unexchanged cobalt and water-soluble magnesium salt on the sepiolite material, which were caused by avoiding the rinsing treatment, gave an adverse effect on the activity in hydrotreating to the resultant catalyst.

Reference Example 8

A copper and Mo on sepiolite catalyst was prepared substantially in the same way as in Example 40 using the same sepiolite as the starting material. In Example 40, the sepiolite was treated with the aqueous solution containing 0.01 mol/l of ammonium nitrate before the step of having each metal supported thereon; however, in this Example, the treatment with the ammonium nitrate solution was avoided. The analysis of the resultant catalyst showed that 2.0% of CuO and 9.1% of MoO$_3$ were contained therein.

By employing this catalyst, Example 40 was repeated to subject the same residual oil to hydrotreating. The analysis of the treated oil 100 hours after starting reaction showed that 0.92% of sulfur content, and 9 ppm of vanadium were contained therein. By comparing this result with that obtained in Example 40, it is understood that the demetallization activity of the resultant catalyst was enhanced by treating the sepiolite with an ammonium nitrate solution in the course of preparation of the catalyst.

EXAMPLES 46–52

As the starting material was employed the sepiolite mineral of Spanish product having a specific surface area of 170 m$^2$/g, a pore volume of 0.59 cc/g, and a pore ratio of 25% in the range of 200 to 400 Å in pore diameter (that is, the pores in the sepiolite, 200 to 400 Å in pore diameter, accounting for 25% of the pore volume). The sepiolite was dried at 200° C. for 3 hours, and ground in a ball mill until all of it attained fineness of 50 mesh or more, more than about 70% of it having fineness of more than 100 mesh. The dried sepiolite powder was incorporated with an aluminium hydroxide sol containing 17% of anhydrous alumina in such an amount as to make the ratio of anhydrous alumina to dry sepiolite 5%, and the water content of the mixture was adjusted to 150% by adding water thereto. The resulting moist mixture was well kneaded by an extruder. The number of passes through the extruder for kneading was determined in such a way that the products as extruded, each of which was passed through the extruder a different number of times, was calcined at 500° C., respectively, and after their pore volumes had beforehand been measured, the number of passes which gave the maximum pore volume was taken as the goal.

According to observation on photomicrographs (magnification×10,000) by electron microscope of the kneaded mixture, it was confirmed that the fascicles of sepiolite fibers were got untied to separate fibers in the case where the kneaded mixture had the maximum pore volume.

The kneaded mixture was molded into cylindrical pellets about 1.0 mm in diameter by a conventional extruder, which were sufficiently air-dried and then calcined at 500° C. for 3 hours to obtain porous sepiolite carriers.

The carriers were subjected to a conventional one-liquid or two-liquid treatment to have Cu, Zn, Ce, V, Mo, Ni and/or Co components supported on the carriers by utilizing ammonium metavanadate for V, ammonium paramolybdate for Mo and the corresponding nitrates for the other metals. The carriers thus treated were calcined at 500° C. for 1 hour to obtain the catalysts shown in Table 11. Each of these catalysts had a specific surface area (BET method) of 180 to 210 m$^2$/g, pore volume of 0.75 to 0.8 cc/g, and pore volume ratio of 40 to 55% in the range of 200 to 400Å in pore diameter.

Each of these catalysts were packed in a high pressure flow-type reactor. A topped residual oil containing 2.87% of sulfur content, 3,600 ppm of nitrogen content, 3.0% of n-heptane-insoluble matter, 150 ppm of vanadium, 41 ppm of nickel, and 3 ppm of iron, was subjected to hydrotreating using the reactor at hydrogen pressure of 140 kg/cm$^2$, a reaction temperature of 400° C. and a liquid space velocity of 2.0 Hr$^{-1}$, with upward flow. The results are shown in Table 11.

From these results, it is clearly shown that the catalyst of the present invention has a very high activity and that the residual oil containing a large amount of metals can be treated over a long period of time according to the method of the present invention.

dry sepiolite in such an amount as to make the ratio of anhydrous alumina to the sepiolite 2.0%, water was added to the mixture to adjust the water content thereof to 135%, and the molded pellets were calcined at 800° C. for 3 hours.

The catalyst of the present invention was obtained by treating the resultant carrier with cobalt nitrate and paramolybdic acid according to a conventional method, to have 2% of cobalt and 6% of molybdenum supported on the carrier.

By employing the resultant catalyst, the same residual oil as used in Examples 46–52 was subjected to hydrotreating, at hydrogen pressure of 110 kg/cm$^2$, reaction temperature of 370° C., and liquid space velocity of 0.8 Hr$^{-1}$. Activity of the catalyst 50 hours after starting the reaction was measured, which is shown in the following:

devanadiuming ratio: 61%
denickling (removal of nickel) ratio: 48%
deironing (removal of iron) ratio: 64%
desulfurization ratio: 24%

EXAMPLE 54

A porous magnesia-silica carrier was obtained in the same way as in Examples 46–52 except that aluminium hydroxide sol was added to dry sepiolite in such an amount as to make the ratio of anhydrous alumina to dry sepiolite 3.0%, copper nitrate was further added thereto in such an amount as to make the ratio of copper to sepiolite 4%, water was added to the mixture to adjust the water content thereof to 145%, the kneaded mixture was molded into cylindrical pellets of 1.5 mm in diameter, and calcining was carried out at 400° C. for 3 hours.

The resultant carrier was treated with an aqueous solution of ammonium paramolybdate according to a conventional method to have 6% of molybdenum supported on the carrier. The carrier thus treated was then calcined at 600° C. for 1 hour to obtain a catalyst of the present invention.

By employing the resultant catalyst, the same residual

Table 11

| Example Nos. | Catalytic metal composition component | % (as metal) | Activity of catalyst after 50 hours DSR[1] | DVE[2] | DNR[3] | DAR[4] | after 500 hours DSR[1] | DVR[2] |
|---|---|---|---|---|---|---|---|---|
| 46 | Cu | 2 | 13 | 42 | <10 | 21 | 9 | 35 |
|    | Mo | 6 | | | | | | |
| 47 | Cu | 12 | 11 | 32 | 10 | 24 | 10 | 29 |
|    | Zn | 12 | | | | | | |
| 48 | Ce | 2 | 17 | 51 | 12 | 27 | 15 | 40 |
|    | Mo | 6 | | | | | | |
| 49 | Ni | 2 | 14 | 47 | 14 | 27 | 12 | 36 |
|    | V | 6 | | | | | | |
| 50 | Co | 3.5 | 29 | 68 | 15 | 35 | 21 | 58 |
|    | Ni | 1.0 | | | | | | |
|    | Mo | 7.5 | | | | | | |
| 51 | Ni | 2.6 | 31 | 65 | 17 | 34 | 26 | 59 |
|    | Co | 1.2 | | | | | | |
|    | Mo | 15.0 | | | | | | |
| 52 | Co | 1.5 | 37 | 70 | 19 | 42 | 24 | 62 |
|    | Mo | 4.8 | | | | | | |

Note:
[1]DSR: desulfurization ratio %
[2]DVR: devanadiuming (removal of vanadium) ratio %
[3]DNR: denitrification ratio %
[4]DAR: deasphaltening (removal of asphaltene) ratio %

EXAMPLE 53

A porous magnesia-silica carrier was prepared in the same way as in Examples 46–52 except that aluminium sulfate instead of aluminium hydroxide sol was added to oil as used in Examples 46–52 was subjected to hydrotreating, at hydrogen pressure of 140 kg/cm$^2$, reaction temperature of 400° C., and liquid space velocity of 0.5 Hr$^{-1}$. Activities of the catalyst 50 hours and 1,000 hours after starting the reaction are shown in the following.

|  | after 50 hours | after 1,000 hours |
|---|---|---|
| devanadiuming ratio (%) | 97 | 88 |
| denickling ratio (%) | 88 | 75 |
| deironing ratio (%) | 98 or more | 91 |
| desulfurization ratio (%) | 74 | 57 |
| denitrification ratio (%) | 57 | 32 |

EXAMPLE 55

The catalyst of the present invention was prepared in the same way as in Examples 46–52 except that cobalt nitrate instead of the aluminium hydroxide sol was added to dry sepiolite in such an amount as to make the ratio of cobalt to sepiolite 3.0% followed by addition of water to adjust the water content thereof to 120%, ammonium paramolybdate was added to the moist mixture in such an amount as to make the ratio of molybdenum to sepiolite 9% followed by kneading and molding the mixture into pellets (instead of adding the catalytic metals to the molded carrier), and calcining was carried out at 500° C. for 3 hours. The resultant porous magnesia-silica catalyst containing cobalt and molybdenum had the following physical properties:

specific surface area (BET method): 216 m²/g
pore volume (>74Å): 0.522 cc/g
pore ratio (200Å–400Å in diameter): 76%

By employing this catalyst, the same residual oil as used in Examples 46–52 was subjected to hydrogenation treatment, at hydrogen pressure of 140 kg/m², a reaction temperature of 370° C. and a liquid space velocity of 0.8 Hr$^{-1}$. Activity of the catalyst 50 hours after starting the reaction is shown in the following.

devanadiuming ratio: 53%
denickling ratio: 40%
desulfurization ratio: 19%

EXAMPLE 56

A porous magnesia-silica carrier was obtained in the same way as in Examples 46–52 except that, in the course of the moistening step, acetic acid was added together with aluminium hydroxide sol and water to dry sepiolite to adjust the pH of the mixture to 4.0.

The resultant carrier was treated with aqueous solutions of nickel nitrate, cobalt nitrate and ammonium paramolybdate according to a conventional impregnating process, to have cobalt, nickel and molybdenum supported on the carrier. The treated carrier was sintered at 600° C. for 1 hour to obtain a catalyst of the present invention. The properties of the catalyst are shown in the following.

| amounts of metals supported (as metal) | Ni | 2.4 % |
|---|---|---|
|  | Co | 1.5 % |
|  | Mo | 14.5 % |
| specific surface area (BET method) |  | 226 m²/g |
| pore volume (>74Å) |  | 0.62 cc/g |
| pore ratio (200Å–400Å in diameter) |  | 66 % |

By employing this catalyst, the same residual oil as used in Examples 46–52 was subjected to hydrotreating, at hydrogen pressure of 140 kg/cm², reaction temperature of 400° C., and liquid space velocity of 2.0 Hr$^{-1}$. The results are shown in the followings:

|  | after starting the reaction | |
|---|---|---|
|  | 50 hours | 500 hours |
| devanadiuming ratio % | 75 | 63 |
| denickling ratio % | 61 | 43 |
| desulfurization ratio % | 33 | 21 |
| denitrification ratio % | 16 | 12 |

EXAMPLE 57

A porous magnesia-silicate carrier was obtained in the same way as in Examples 46–52 except that, in the course of the moistening step, acid clay containing 60% of SiO₂ and 15% of Al₂O₃ was added to the dry sepiolite in place of aluminum hydroxide sol in such an amount as to make the ratio of acid clay to sepiolite 5%, water was added thereto to adjust the water content to 160%, and the moist mixture was molded into cylindrical pellets 1.5 mm in diameter followed by calcining at 400° C. for 3 hours.

The resultant carrier was treated with aqueous solutions of nickel nitrate and ammonium paratungstate according to a conventional impregnating process, to have the nickel and tungsten compounds supported on the carrier in the amounts of 5.1% and 12.7% as metals, respectively. The treated carrier was calcined at 600° C. for 1 hour. The main properties of the resultant catalyst are shown in the following specific surface area (BET method): 175 m²/g
pore volume (>74 Å): 0.76 cc/g
pore ratio (200 to 400 Å in diameter): 51%

By employing this catalyst, the same residual oil as used in Examples 46–52 was subjected to hydrotreating, at a hydrogen pressure of 160 kg/cm², a reaction temperature of 400° C. and liquid space velocity of 0.8 Hr$^{-1}$, to obtain the following results.

|  | after starting the reaction | |
|---|---|---|
|  | 50 hours | 1,000 hours |
| devanadiuming ratio | 92 (%) | 78 (%) |
| denickeling ratio | 79 | 56 |
| desulfurization ratio | 67 | 43 |

As the comparative or reference examples, are shown in the following the results obtained by carrying out the reactions under the same conditions, by employing the catalyst of cobalt and molybdenum supported on a conventional alumina carrier or the catalyst which was prepared by having cobalt, nickel and molybdenum supported on untreated sepiolite mineral of 6 to 20 mesh in fineness.

Reference Examples 9–11

The conventional desulfurization catalysts (I) and (II) were prepared by having 3 or 3.5% (hereinafter as metal) of cobalt and 8 or 10% of molybdenum supported on alumina carrier. The other catalyst was prepared by having 3.5% of cobalt, 1.1% of nickel and 7.2% of molybdenum supported on the untreated sepiolite having a specific surface area (BET method) of 154 m²/g and pore volume (>74 Å) of 0.52 cc/g.

By employing these catalysts, the same residual oil as used in Examples 46–52 was subjected to hydrotreating, at hydrogen pressure of 140 kg/cm², reaction temperature of 400° C. and liquid space velocity of 2.0 Hr$^{-1}$, with upward flow. The results are shown in Table 12.

From these results, it is clearly shown that the catalysts according to the present invention have a markedly large demetallization (removal of metals) activity and a longer life of catalytic activity.

When compared with the untreated sepiolite carrier, the catalyst of the present invention has a larger demetallization activity even when the amounts and kinds of the catalytic metals are identical. Also in comparison with the physical properties of these catalysts, the present catalysts have a markedly larger specific surface area and pore volume.

Table 12

| Reference Example Nos. | Catalyst employed | After starting the treatment | | | | | |
|---|---|---|---|---|---|---|---|
| | | 50 hours | | 500 hours | | 1,000 hours | |
| | | DVR* | DSR** | DVR* | DSR** | DVR* | DSR** |
| 9 | desulfurization catalyst (I) | 64 | 75 | 40 | 46 | 13 | 22 |
| 10 | desulfurization catalyst (II) | 69 | 73 | 58 | 55 | 29 | 35 |
| 11 | catalyst with sepiolite | 73 | 32 | 70 | 29 | 62 | 22 |

*DVR: devanadiuming ratio %
**DSR: desulfurization ratio %

EXAMPLE 58

A crushed sepiolite of Spanish product 1 to 2 mm in diameter was employed as the starting material. The sepiolite was dried at 200° C. for 3 hours and then subjected to dry milling in a ball mill to such an extent that finely devided powder of 100 mesh or more was obtained in an amount of about 70% of the whole powder, the coarse powder of larger than 50 mesh being sieved off.

Aluminium hydroxide sol containing 17% of alumina was added to the sepiolite powder in such an amount as to make the ratio of alumina content to dry sepiolite 5% and then water was added thereto to adjust the water content thereof to about 150%, to obtain rather hard paste. The paste was fully kneaded by passing it through an extruder three times, followed by molding it into cylindrical pellets 1.0 mm in diameter by the extruder. The pellets were air-dried and then calcined at 500° C. for 3 hours to obtain molded product. The properties of the resultant product are shown in Table 13 in comparison with those of the starting material sepiolite (dried at 200° C.).

Table 13

| | molded sepiolite | starting material |
|---|---|---|
| (1) specific surface area (BET method, m²/g) | 216 | 170* |
| specific surface area >74 Å (m²/g) distribution thereof | 113 | 71 |
| 74–200 Å | 33 | 29 |
| 200–600 Å | 73 | 31 |
| >600 Å | 7 | 11 |
| (2) pore volume >74 Å (cc/g) distribution thereof | 0.83 | 0.59 |
| 74–200 Å | 0.13 | 0.11 |
| 200–600 Å | 0.62 | 0.27 |
| >600 Å | 0.08 | 0.21 |
| (3) crushing strength (kg) | 1.2–1.8 | — |
| (4) soaking in an aqueous solution of cobalt nitrate | homogeneous coloring | unhomogeneous coloring |

*calcined at 500° C. for the purpose of the comparison with the molded sepiolite.

Incidentally, the difference in coloring after impregnating in an aqueous solution of cobalt nitrate (4) in Table 13 is due to the difference in homogenuity of the cobalt-supporting on the sepiolite, which indicates that cobalt was homogeneously supported on the molded sepiolite.

EXAMPLE 59

A molded sepiolite was obtained in the same way as in Example 58 except that, in the course of moistening step, the aluminium hydroxide sol was added to the sepiolite powder in such an amount as to make the ratio of anhydrous alumina to dry sepiolite 1.5% and an aqueous nitric acid solution containing 0.1 mol/l of nitric acid was added thereto instead of pure water to adjust the water content thereof to 120%. The calcined product had the following properties.

(1) specific surface area (BET method): 250 m²/g
(2) pore volume >74 Å: 0.58 cc/g As to the distribution of pore, most of large pores 600 Å or more in diameter were disappeared; and the pores 200 to 400 Å in diameter accounted for about 70% of the whole pore volume.

(3) crushing strength: 4.6–6.0 kg

The molded product obtained in this Example was subjected to X-ray diffraction analysis, the pattern of which clearly showed a peak in the neighborhood of 2 $\theta = 7°$, and it was assured that the molded product of this invention was converted to thermaly stable forms.

EXAMPLE 60

A molded product was prepared in the same way as in Example 58 except that aluminium nitrate instead of the aluminium hydroxide sol was added to the sepiolite powder in such an amount as to make the ratio of aluminium metal to dry sepiolite 3.0%, water content was adjusted to 130%, and sintering was carried out at 800° C. The sintered product had the following properties.

(1) specific surface area (BET method): 237 m²/g
(2) pore volume >74 Å: 0.49 cc/g
(3) crushing strength: 4.7–7.5 kg From these results, it is evident that the molded product has a rather smaller pore volume, but has a larger specific surface area and markedly larger crushing strength.

EXAMPLES 61–63

Molded products were obtained in the same way as in Example 58 except that, in the course of moistening step, the aluminium hydroxide sol was added to the sepiolite powder in such an amount as to make the ratio of anhydrous alumina to dry sepioiite 1.5%, an aqueous solution of copper nitrate, cerium chloride or nickel sulfate was added thereto instead of pure water in an amount of 2% as Cu, Ce or Ni on the basis of dry sepiolite, respectively, and the water content thereof was adjusted to 130%. The sintered products had the following properties as shown in Table 14.

Table 14

| | Example Nos. | | |
|---|---|---|---|
| | 61 | 62 | 63 |
| (1) additives (metal salts) | Cu(NO$_3$)$_2$ | CeCl$_3$ | NiSO$_4$ |
| (2) specific surface area (BET method, m$^2$/g) | 241 | 249 | 232 |
| (3) pore volume (>74 Å, cc/g) | 0.55 | 0.57 | 0.58 |
| (4) crushing strength (kg) | 5.0-6.5 | 4.7-6.0 | 3-5.0 |

Measurement of the pore distribution clearly showed that most of the large pores of more than 600 Å in diameter disappeared in these molded products and the pores in the range of 200 to 400 Å in diameter accounted for 70 to 80% of the whole pore volume and had a very sharp distribution curve. The X-ray diffraction patterns showed that the products were thermally stable since the peaks in the neighborhood of 2 $\theta=7°$ were scarcely lowered.

EXAMPLE 64

A molded product was obtained in the same way as in Example 58 except that cobalt nitrate was added to the sepiolite powder in such an amount as to make the ratio of cobalt metal to dry sepiolite 3.0%, pure water was added thereto to adjust the water content thereof to 120%, and then ammonium molybdate was further added thereto in such an amount as to make the ratio of molybdenum metal to dry sepiolite about 9%. The calcined product had the following properties.

(1) specific surface area (BET method): 216 m$^2$/g
(2) pore volume (>74 Å): 0.52 cc/g
(3) pore distribution (ratio in the range of 200 to 400 Å): 76%
(4) crushing strength: 3.0-4.5 kg

EXAMPLE 65

Sepiolite of Korean product was crushed to the fineness 4 to 5 mm in diameter to be employed as the starting material. The crushed sepiolite was impregnated for two days and nights in the aqueous solution containing 0.1 mol/l of nickel nitrate and then sufficiently washed with warm water maintained at 50° C. Incidentally, the resultant nickel on sepiolite was calcined at 500° C. for 2 hours and the analysis thereof showed that 2.1% of nickel oxide was contained therein. According to the analysis of the aqueous nickel nitrate solution in which sepiolite was soaked, magnesium was dissolved therein in an amount about 2.6 times (atomic ratio) as much as that of nickel supported on sepiolite.

Then, about 3 parts of water was added to one part of the nickel on sepiolite-material, and the resultant mixture was well kneaded by a kneader. Through this kneading step, the crushed sepiolite was ground to powder. After the mixture was kneaded enough to provide it with molding property, the kneaded mixture was dried at 60° C. for a short time, followed by addition of water to adjust the water content thereof to about 130%. The moist mixture was kneaded again for such a short time that the water content did not change, and then molded into cylindrical pellets 1.7 mm in diameter. The molded pellets were air-dried for about 5 days in the air and then calcined at 500° C. for 1 hour to obtain a nickel on sepiolite-catalyst. The physical properties of the resultant catalyst as well as those of the starting sepiolite which was calcined at 500° C. for 1 hour are shown in Table 15.

Table 15

| | nickel on sepiolite-catalyst (calcined at 500° C.) | starting material sepiolite (calcined at 500° C.) |
|---|---|---|
| specific surface area (BET method) | 232 m$^2$/g | 153 |
| specific surface area (mercury porosimeter method >30 Å) | 133 m$^2$/g | 65 |
| pore volume (mercury porosimeter method >30 Å) | 0.68 cc/g | 0.52 |
| pore distribution (mercury porosimeter method >30 Å) | | |
| 30-200 Å | 0.19 cc/g | 0.12 |
| 200-600 Å | 0.44 cc/g | 0.20 |
| 600 Å | 0.05 cc/g | 0.18 |
| crushing strength (radical direction) | 3.5 -5.0 kg | — |

From Table 15, it will be understood that the nickel on sepiolite molded catalyst obtained according to the present invention has the physical properties significantly different from those of the starting material sepiolite. That is, the molded product of the invention has (1) a larger specific surface area, (2) a larger pore volume, and (3) a sharper distribution curve, in comparison with the starting material sepiolite. The nickel on sepiolite molded product is clearly different in property from the product obtained by merely having nickel supported on the starting material sepiolite. Thus, it would be understood that the treatment procedure for sepiolite according to the present invention is quite different from a mere molding procedure (conventional carriers).

A cracked petroleum oil (boiling point: 200°-500° C.) containing 2.4% of sulfur and 14 ppm of vanadium and having bromine number 26 was subjected to hydrotreating by employing this catalyst. Reaction was carried out by using a conventional flow-type high pressure reactor at a reaction temperature of 360° C., hydrogen partial pressure of 50 kg/cm$^2$ and liquid space velocity of 1.0 Hr$^{-1}$. The analysis of the treated oil 50 hours after starting the reaction showed the decreases in sulfur to 2.1%, vanadium to 5 ppm and bromine number to 16.

EXAMPLE 66

The nickel on sepiolite molded catalyst which had been obtained in Example 65 was air-dried and then baked at 200° C. for 1 hour. The baked product was impregnated in an aqueous ammonium solution of ammonium paramolybdate and then calcined at 500° C. for 1 hour, to obtain a nickel and molybdenum on sepiolite-catalyst. The analysis of the resultant catalyst showed that 2.0% of NiO and 4% of MoO$_3$ were contained therein. The physical properties of the catalyst measured in the same way as in Example 65 were similar to those of the catalyst obtained in Example 65, except that the specific surface area (BET method) and pore volume were slightly decreased to 226 m$^2$/g and 0.66 cc/g, respectively.

The same cracked petroleum oil as used in Example 65 was subjected to hydrotreating using the same apparatus under the same conditions as in Example 65, by employing the resultant catalyst. (That is, Example 65 was repeated by employing this catalyst.) The analysis of the treated oil showed the decreases in sulfur to 0.89%, vanadium to 3 ppm and bromine number to 14.

EXAMPLE 67

In the kneading step of the unformed (not molded) nickel on sepiolite-material in Example 65, a predetermined amount of ammonium paratungstate was added thereto, to prepare a nickel and tungsten on sepiolite-catalyst. The kneading, moistening, molding and calcining steps were carried out in the way and under the condition similar to those of Example 65. The analysis of the resultant catalyst showed that 2.0% of NiO and 7.8% of $WO_3$ were contained therein. The physical properties of the catalyst were similar to those of the catalyst obtained in Example 65, as in the case of Example 64.

By employing this catalyst, a topped residual oil containing 2.62% of sulfur, 3,600 ppm of nitrogen, 3.2% of n-heptane-insoluble matter, 130 ppm of vanadium, and 41 ppm of nickel was subjected to hydrotreating using the same reaction apparatus as in Example 65. The reaction was carried out at reactive hydrogen pressure of 140 kg/cm$^2$, reaction temperature of 420° C. and liquid space velocity of 0.5 Hr$^{-1}$. The analysis of the treated oil showed the following results. Sulfur: 0.31%; Nitrogen: 2,100 ppm; n-heptane-insoluble matter: 0.3%; Vanadium: 2 ppm; and Nickel: 3 ppm.

EXAMPLE 68

A copper and molybdenum on sepiolite-catalyst was prepared in the same way as in Example 65.

A sepiolite of Spanish product was crushed to the particle size of 1–2 mm in diameter and impregnated for a whole day and night in the aqueous solution containing 0.1 mol/l of magnesium nitrate, followed by sufficient washing with warm water. The treated sepiolite was impregnated in the aqueous solution containing 0.02 mol/l of copper nitrate, and rinsed with warm water and then with 5% ammonia water, followed by drying at 120° C. for 2 hours. To the dried sepiolite, were added 3% (based on anhydrous alumina) of an aluminium hydroxide sol containing 16% of alumina, 25% of attapulgite clay of the U.S. product and 200% of water, followed by wet milling for about 10 hours. An aqueous ammonium solution of ammonium paramolybdate was then added thereto and the mixture was sufficiently kneaded, followed by repeating drying (at 60° C.) and water spray to adjust the water content thereof to 210%. The moist mixture was molded into cylindrical pellets 1.7 mm in diameter, which was then dried for about a week and calcined at 500° C. for two hours. Thus, a copper and molybdenum on sepiolite-catalyst was obtained. The analysis of the resultant catalyst showed that 2.4% of CuO and 6.4% of $MoO_3$ were contained therein. The physical properties of the catalyst measured in the same way as in Example 65 are shown in Table 16.

Table 16

| Properties of copper and molybdenum on sepiolite-catalyst | |
|---|---|
| specific surface area (BET method) | 210 m$^2$/g |
| specific surface area (mercury porosimeter method, >30 Å) | 107 m$^2$/g |
| pore volume (mercury porosimeter method, >30 Å) | 0.74 cc/g |
| pore distribution (mercury porosimeter method) | |
| 30–200 Å | 0.13 cc/g |
| 200–600 Å | 0.35 cc/g |
| >600 Å | 0.26 cc/g |
| crushing strength (radial direction) | 2.2–4.7 kg |

Example 67 was repeated to carry out hydrotreating by employing this catalyst. The analysis of the treated oil 50 hours after starting the reaction showed the following results. Sulfur: 0.28%; Nitrogen: 2,200 ppm; Vanadium: ≦2 ppm; and Nickel: ≦2 ppm.

EXAMPLE 69

A cerium and molybdenum on sepiolite-catalyst was prepared substantially in the same way as in Example 68. Crushed sepiolite of Spanish product was impregnated with stirring in the aqueous solution containing 0.01 mol/l of nitric acid and 0.1 mol/l of magnesium nitrate for 5 hours. The treated sepiolite was further impregnated in the aqueous solution containing 0.1 mol/l of cerium nitrate for 5 hours to obtain a cerium on sepiolite-material. After the cerium on sepiolite-material was sufficiently washed with warm water, thereto were added, on the basis of sepiolite, 5% (as anhydrous alumina) of aluminium hydroxide sol containing 16% of alumina, 25% of bauxite containing 1.8% of $TiO_2$ and 5.1% of $Fe_2O_3$, and about 150% of water, followed by subjecting the mixture to wet milling for 10 hours. An aqueous ammonium solution of ammonium paramolybdate was added to the ground mixture and then sufficiently kneaded, followed by adjusting the water content thereof to 125%. The moist mixture was molded into cylindrical pellets 1.0 mm in diameter, which were air-dried for about one week and then calcined at 650° C. for 2 hours. Thus, a cerium and molybdenum on sepiolite-catalyst was obtained. The analysis of the catalyst showed that 1.2% of $Ce_2O_3$ and 3.1% of $MoO_3$ were contained therein. The physical properties of the catalyst were measured to be 146 m$^2$/g in specific surface area (mercury porosimeter method, diameter ≧30 Å) and 0.57 cc/g in pore volume.

Example 67 was repeated to carry out hydrotreating by employing this catalyst. The treated oil 50 hours after starting the reaction contained 0.45% of sulfur and ≦2 ppm of vanadium.

EXAMPLES 70–72

A hydrogenation catalyst for treating hydrocarbons was prepared from a sepiolite of Spanish product. The crushed sepiolite having particle sizes of 1 to 2 mm in diameter was ground to 50 mesh pass, and water was added thereto followed by sufficient kneading by a kneader. In the course of the kneading, 5.0% (as anhydrous alumina) of aluminium hydroxide sol containing 20% of alumina was added thereto and the mixture was further kneaded to mix it up. By spraying water onto the kneaded mixture, it was homogeneously moistened to adjust the water content thereof to 200% and then molded into cylindrical pellets 1.0 mm in diameter by an extruder. The molded pellets were air-dried at room temperature for about a whole day and night and further dried at 120° C. for 3 hours. The resultant molded sepiolite product which had been calcined at 500° C. for 1 hour had a pore volume (mercury porosimeter method, >30 Å) of 0.92 cc/g and a specific surface area (BET method by means of $N_2$ adsorption) of 171 m$^2$/g.

The molded sepiolite product dried at 120° C. was impregnated in 5 times by volume of an aqueous acidic solution containing 0.1 mol/l of cobalt nitrate, copper nitrate or lanthanum nitrate for about two days and nights and taken out, followed by washing it sufficiently with warm water at 45° to 50° C. Incidentally, it was observed that magnesium was dissolved in the acidic aqueous solution. The washing with warm water was repeated until a metal ion such as Co ion was scarcely observed in the waste washing water. The resultant metal on sepiolite molded product was baked at 200° C. for about 2 hours, and was further calcined at 500° C. for 1 hour to obtain a calcined product. The measurement of the physical properties thereof according to mercury porosimeter showed that it had a pore volume in the range of 0.75–0.80 cc/g and a specific surface area of 115–120 m²/g (>30 Å), irrespective of the kind of the metals supported. The color of Co or Cu on sepiolite molded product scarcely changed when baked at 200° or 500° C. and was substantially the same as that of a sepiolite molded product which did not support the metal thereon.

Onto the Co, Cu or La on sepiolite molded product, an aqueous solution containing a predetermined amount of ammonium paramolybdate and about 7% of ammonia was sprayed to impregnate it with about 6% (as $MoO_3$) of molybdenum. The impregnated product was dried at 120° C. for about 3 hours and then calcined at 500° C. for about 1 hour to obtain a Mo and Co, Cu or La on sepiolite-catalyst.

The physical properties of the resultant catalysts as well as the amounts of the metals supported are shown in Table 17.

Table 17

|  | Examples | | | Reference |
| --- | --- | --- | --- | --- |
|  | 70* | 71 | 72 | Example |
| Amount of metals supported | | | | |
| CoO, CuO, $La_2O_3$ (%) | CoO; 1.8 | CuO; 2.3 | $La_2O_3$; 1.1 | 0 |
| $MoO_3$ (%) | 6.1 | 5.6 | 6.2 | 0 |
| specific surface area (BET method) (m²/g) | 147 | 134 | 155 | 171 |
| pore volume (>30 Å)** (cc/g) | 0.77 | 0.72 | 0.76 | 0.92 |
| pore distribution** | | | | |
| 30–100 Å (cc/g) | 0.032 | 0.030 | 0.026 | 0.040 |
| 100–400 Å (cc/g) | 0.451 | 0.455 | 0.466 | 0.472 |
| >400 Å | 0.290 | 0.232 | 0.270 | 0.409 |

*carrier without catalytic metal
**according to mercury porosimeter method

From Table 17, it is shown that the pore volume of the metals on sepiolite-catalysts obtained according to the present invention are smaller than that of the sepiolite carrier which was obtained by simply calcining the sepiolite molded product, but the ratio of decrease in pore volume predominates in large pores more than 400 Å in diameter. Incidentally, the pore volume of the starting material sepiolite which had been simply calcined at 500° C. for 1 hour was 0.59 cc/g. Therefore, the pore volumes of the metals on sepiolite-catalysts according to the present invention are far larger than that of the starting material sepiolite and the ratio of the large pores in the present catalysts is lowered in comparison with that of the simply calcined molded product; thus it is understood that the catalysts of the present invention have a very sharp pore distribution.

By employing each of these catalysts, a topped residual oil containing 2.62% of sulfur, 3,600 ppm of nitrogen, 130 ppm of vanadium, 41 ppm of nickel and 3.0% of asphaltene was subjected to hydrotreating. Reaction was carried out by using a conventional flow-type high pressure reactor at reaction temperature of 375° C., hydrogen pressure of 140 kg/cm² and liquid space velocity of 0.5 $Hr^{-1}$. The analysis of the treated oil 100 hours after starting the reaction showed the results given in the following Table 18.

Table 18

| Impurities in the treated oil | Example 70 | Example 71 | Example 72 |
| --- | --- | --- | --- |
| sulfur (%) | 1.15 | 1.03 | 1.38 |
| nitrogen (ppm) | 2,800 | 2,400 | 3,000 |
| vanadium (ppm) | 20 | 26 | 21 |
| nickel (ppm) | 11 | 9 | 10 |
| asphaltene (%) | 1.6 | 1.4 | 1.7 |

EXAMPLE 73

The same sepiolite as employed in Examples 70–72 was impregnated in the aqueous solution containing 0.1 mol/l of ammonium nitrate for a whole day and night, and then was well rinsed with warm water. The sepiolite was subjected to wet milling to obtain fine powder, and then 3% (as alumina) of aluminium nitrate was added thereto followed by sufficient kneading by a kneader. The kneaded mixture was repeatedly dried at 80° C. and sprayed with water to adjust the water content thereof to 120%. The moist mixture was molded into cylindrical pellets 1.0 mm in diameter, which were sufficiently air-dried and then dried at 120° C. The method of Examples 70–72 were repeated to have cobalt and nickel supported on the dried pellets. The resultant pellets were calcined at 500° C. for 1 hour to obtain a catalyst of the present invention. The properties of the catalyst are shown in Table 19.

Table 19

| Amount of metals supported | CuO : 2.0% |
| --- | --- |
|  | $MoO_3$ : 6.3 % |
| specific surface area | 162 m²/g |
| pore volume | 0.61 cc/g |
| pore distribution | |
| 30–100 Å | 0.058 cc/g |
| 100–400 Å | 0.503 |
| >400 Å | 0.046 |

By employing this catalyst, a vacuum gas oil containing 2% of sulfur is subjected to desulfurization at hydrogen pressure of 30 kg/cm², reaction temperature of 380° C., and liquid space velocity of 1.0 $Hr^{-1}$. The sulfur content in the treated oil was decreased to 0.29% about 100 hours after starting the reaction.

EXAMPLE 74

A Co and Mo on sepiolite-catalyst was prepared substantially in the same way as in Example 73. To the sepiolite were added 20% (as anhydride) of attapulgite of the U.S. product instead of aluminium nitrate, 3% (as alumina) of the same aluminium hydroxide sol as employed in Examples 70–72, and 3% of ammonium nitrate, followed by kneading. The kneaded mixture was moistened to adjust its water content to 125% and molded into pellets, which were dried at 200° C. for 1 hour. The method of Example 70 was repeated to have cobalt and molybdenum supported on the pellets, which were calcined at 500° C. The analysis of the resultant catalyst showed that 1.6% of CoO and 6.0% of $MoO_3$ were contained therein. The catalyst had a specific surface area of 159 m²/g according to BET method. Also it had a whole pore volume of 0.68 cc/g and a large pore volume (>400 Å) of 0.102 cc/g, according to mercury porosimeter method.

By employing this catalyst, a solvent-deasphalted oil was subjected to hydrogenation treatment using the same reaction apparatus as used in Examples 70–72. The deasphalted oil containing 2.4% of sulfur, 26 ppm of vanadium and 12 ppm of nickel was treated at a reaction temperature of 380° C., hydrogen pressure of 100 kg/cm$^2$, and liquid space velocity of 1.0 Hr$^{-1}$. The analysis of the treated oil 100 hours after starting the reaction showed the decreases in sulfur content to 1.22%, vanadium to 5 ppm, and nickel to 4 ppm.

EXAMPLES 75 and 76

To the same crushed sepiolite as employed in Examples 70–72 were added and 20% (as anhydride) of a bauxite containing 2.3% (as TiO$_2$) of titanium and 4.9% (as Fe$_2$O$_3$) of iron, followed by wet milling by a ball mill. The ground mixture was subjected to levigation at 50 mesh and then 3% (as alumina) of an aluminium hydroxide sol was added thereto with sufficient kneading. The kneaded mixture was calcined at 500° C. until the pore volume thereof reached 0.82 cc/g, dried at 80° C., and homogeneously moisted to adjust the water content thereof to 120%. The resultant moist mixture was molded into cylindrical pellets 1.5 mm in diameter, which were sufficiently air-dried and then baked at 300° C. for 2 hours. The calcined pellets were impregnated in the aqueous solution containing 0.02 mol/l of nickel sulfate for about a whole day and night and then rinsed sufficiently with warm water. The resultant nickel-sepiolite-pellets were baked at 300° C. for 2 hours, and then an aqueous ammonium solution (containing 5% of ammonia) of a predetermined amount of vanadium oxalate or ammonium paratungstate was sprayed on the pellets to have vanadium or tunsten supported thereon. The sprayed pellets were calcined at 650° C. for 2 hours to prepared a Ni and V on sepiolite- or Ni and W on sepiolite-catalyst. The physical properties and the amounts of the metals supported on these catalysts are shown in Table 20.

Table 20

|  | Example 75 | Example 76 |
| --- | --- | --- |
| amount of metals supported | (Ni, V) | (Ni, W) |
| NiO | 1.2 % | 1.3 % |
| V$_2$O$_5$ or WO$_3$ | 4.7 % | 3.1 % |
| specific surface area (BET method) | 155 m$^2$/g | 140 m$^2$/g |
| pore volume (>30 Å) | 0.61 cc/g | 0.66 cc/g |
| pore distribution |  |  |
| 30–100 Å | 0.058 cc/g | 0.062 cc/g |
| 100–400 Å | 0.305 cc/g | 0.343 cc/g |
| >400 Å | 0.246 cc/g | 0.259 cc/g |

By employing each of these catalysts, hydrotreating was carried out by using the same residual oil and the same apparatus as in Examples 70–72 at hydrogen pressure of 140 kg/cm$^2$, reaction temperature of 420° C. and liquid space velocity of 2.0 Hr$^{-1}$. The analysis of the treated oil showed the results given in Table 21.

Table 21

| Impurities in the treated oil | Example 75 | Example 76 |
| --- | --- | --- |
| sulfur (%) | 1.48 | 1.21 |
| vanadium (ppm) | 22 | 22 |
| nickel (ppm) | 11 | 15 |
| asphaltene (%) | 1.3 | 0.9 |

EXAMPLE 77

To the sepiolite which had been ground to fine powder as in Examples 70–72 were added, on the basis of 1 kg of anhydrous sepiolite, 1 l. of the aqueous solution containing 0.1 mol/l of nitric acid and 5% (as alumina) of an aluminium hydroxide sol containing 20% of anhydrous alumina, followed by sufficient kneading by a kneader. In the course of the kneading, the samples of the kneaded mixture were molded by an extruder and calcined at 500° C. to test the pore distribution and pore volume of the calcined pellets according to mercury porosimeter method. The kneading was discontinued after large pores more than 400 Å in diameter were scarcely observed in the pore distribution of the molded test pellets. Then, the kneaded mixture was homogeneously moistened by repeating water spray and drying at 80° C. to adjust the water content thereof to 130%.

The moist mixture was molded into cylindrical pellets 1.0 mm in diameter, which were sufficiently air-dried and baked at 200° C. for 3 hours. The baked pellets were impregnated in the aqueous solution containing 0.1 mol/l of ammonium chloride for about two days and nights and then washed sufficiently with pure water. The rinsed pellets were then impregnated in the aqueous solution containing 0.1 mol/l of copper nitrate for about two days and nights and then rinsed sufficiently with pure water. The treated pellets were dried at 120° C. and then calcined at 500° C. for two hours to obtain a copper on sepiolite-catalyst. The properties of the catalyst are shown in Table 22.

Table 22

| amount of the metal supported | CuO 2.8 % |
| --- | --- |
| specific surface area | 175 m$^2$/g |
| pore volume (>30 Å) | 0.48 cc/g |
| pore distribution |  |
| 30–100 Å | 0.027 cc/g |
| 100–400 Å | 0.42 cc/g |
| >400 Å | 0.031 cc/g |

By employing this catalyst, the same topped residual oil as used in Examples 70–72 was subjected to hydrotreating under the same conditions as in Examples 75 and 76. The treated oil 100 hours after starting the reaction contained the following impurities.

| sulfur | 2.16 % |
| --- | --- |
| vanadium | 36 ppm |
| nickel | 25 ppm |
| asphaltene | 1.8 % | sulfur: 2.16%
vanadium: 36 ppm
nickel: 25 ppm
asphaltene: 1.8%

While the invention has been particularly shown and described with reference to the embodiments thereof, it will be understood that the foregoing and other changes can be made without departing from the spirit and scope of the invention.

What is claimed is:

1. A method for hydrotreating to dometalize hydrocarbons with pressurized hydrogen at a pressure of from about 10 to about 350 kg/cm$^2$ and at a temperature of from about 300° to about 500° C. in the presence of a catalyst comprising sepiolite having supported thereon at least one catalytic metallic component of at least one metal selected from the group consisting of metals of group IIb and the transition metals of the periodic table.

2. The method of claim 1 wherein said hydrotreating of the hydrocarbons is carried out under a partial pressure of hydrogen of more than about 10 kg/cm$^2$.

* * * * *

UNITED STATES PATENT AND TRADEMARK OFFICE
Certificate

Patent No. 4,152,250                                                    Patented May 1, 1979

Masayoshi Inooka, Motoyoshi Wakabayashi, Masatoshi Matsuda, Masaaki Kasuya, Yoshihiro Ohguchi, Munekazu Nakamura and Tatsuo Morimoto Application having been made by Masayoshi Inooka, Motoyoshi Wakabayashi, Masatoshi Matsuda, Masaaki Kasuya, Yoshihiro Ohguchi, Munekazu Nakamura and Tatsuo Morimoto, the inventors named in the patent above identified, and Chiyoda Chemical Engineering and Construction Co., Ltd., Kanagawa, Japan, the assignee, for the issuance of a certificate under the provisions of Title 35, Section 256, of the United States Code, deleting the name of Yoshihiro Ohguchi as a joint inventor, and a showing and proof of facts satisfying the requirements of the said section having been submitted, it is this 28th day of April 1981, certified that the name of the said Yoshihiro Ohguchi is hereby deleted from the said patent as a joint inventor with the said Masayoshi Inooka, Motoyoshi Wakabayashi, Masatoshi Matsuda, Masaaki Kasuya, Munekazu Nakamura and Tatsuo Morimoto.

FRED W. SHERLING,
*Associate Solicitor.*

UNITED STATES PATENT AND TRADEMARK OFFICE
CERTIFICATE OF CORRECTION

PATENT NO. : 4,152,250
DATED : May 1, 1979
INVENTOR(S) : INOOKA ET AL

It is certified that error appears in the above-identified patent and that said Letters Patent are hereby corrected as shown below: In the title of the invention on the cover page and the first line of Col. 1: "DEMETALLATION" should read --DEMETALLIZATION--. On the cover page, item [30], the Foreign Application Priority Data should read only:
--Dec. 9, 1975 [JP]    Japan. . . . . . . . . . .50-145902
--Jan. 23, 1976 [JP]   Japan. . . . . . . . . . ..51-5816--.

Column 2, lines 11 and 12: "a largesized reaction" should read --large-sized reactors--. Column 2, line 25: "detallization" should read --demetallization--. Column 3, line 51: "Cu" should read --Cr--. Column 14, line 62: "hydrogen" should read --hydrogen sulfide--. Column 16, Table 1: the subheadings "amount of metal" and "activity" should appear underneath the headings "Catalytic metal" and "Catalytic", respectively. Column 16, Table 2: the subheading "DSSR" under "after 50 hours" should read --DSR--. Column 19, Table 7: --3.2-- should be inserted in place of the dash under the subheading "asphaltenes". Column 25, Table 11: the subheading "DVE" under "after 50 hours" should read --DVR--. Column 38, line 56 (Claim 1): "dometalize" should read --demetallize--; line 57 (Claim 1): --which comprises treating the hydrocarbons-- should be inserted after "carbons"; and line 66 (Claim 2): "hydrogen" should read --hydrogen sulfide--.

Signed and Sealed this

Twenty-sixth Day of January 1982

[SEAL]

Attest:

GERALD J. MOSSINGHOFF

Attesting Officer    Commissioner of Patents and Trademarks